United States Patent
Kadous et al.

(10) Patent No.: US 6,654,408 B1
(45) Date of Patent: Nov. 25, 2003

(54) METHOD AND SYSTEM FOR MULTI-CARRIER MULTIPLE ACCESS RECEPTION IN THE PRESENCE OF IMPERFECTIONS

(75) Inventors: Tamer Adel Kadous, Madison, WI (US); Akbar Muhammed Sayeed, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 578 days.

(21) Appl. No.: 09/699,051

(22) Filed: Oct. 27, 2000

(51) Int. Cl.⁷ .............................................. H04B 1/707
(52) U.S. Cl. ...................................... 375/148; 375/260
(58) Field of Search ................................ 375/144, 148, 375/260; 370/320, 335, 342, 441

(56) References Cited

U.S. PATENT DOCUMENTS

| | | |
|---|---|---|
| 5,521,937 A | 5/1996 | Kondo et al. |
| 5,570,350 A | 10/1996 | Myer et al. |
| 5,694,388 A | 12/1997 | Sawahashi et al. |
| 5,734,647 A | 3/1998 | Yoshida et al. |
| 5,737,326 A | 4/1998 | I et al. |
| 5,867,478 A | 2/1999 | Baum et al. |
| 5,881,056 A | 3/1999 | Huang et al. |
| 5,912,876 A | 6/1999 | H'mimy |
| 5,959,965 A | 9/1999 | Ohkubo et al. |
| 5,987,063 A | 11/1999 | Rinne |
| 6,005,840 A | 12/1999 | Awater et al. |
| 6,035,003 A | 3/2000 | Park et al. |
| 6,088,327 A | 7/2000 | Muschallik et al. |
| 6,097,712 A | 8/2000 | Secord et al. |
| 6,262,981 B1 * | 7/2001 | Schmutz ..................... 370/347 |
| 6,351,500 B2 * | 2/2002 | Kumar ....................... 375/270 |

OTHER PUBLICATIONS

Khaled Fazel, "Performance of CDMA/OFDM for Mobile Communication System," Conf. Record ICUPC'93, IEEE, pp. 975–979.

Antoine Chouly, et al., "Orthogonal multicarrier techniques applied to direct sequence spread spectrum CDMA systems," Proc. GLOBECOM'93, IEEE, Nov. 1993, pp. 1723–1728.

Thierry Pollet, et al., "BER Sensitivity of OFDM Systems to Carrier Frequency Offset and Wiener Phase Noise," IEEE, Trans. Commun., vol. 43, No. 2/3/4, Feb./Mar./Apr. 1995, pp. 191–193.

Patrick Robertson, et al., "Analysis of the Effects of Phase-Noise in Orthogonal Frequency Division Multiplex (OFDM) Systems," Proc. ICC'95, IEEE, Seattle, Washington, Jun. 1995, pp. 1652–1657.

Shinsuke Hara, et al., "Overview of Multicarrier CDMA," IEEE Communications Magazine, Dec. 1997, pp. 126–133.

Akbar M. Sayeed, et al., "Joint Multipath–Doppler Diversity in Mobile Wireless Communications," IEEE Trans. Commun., vol. 47, No. 1, Jan. 1995, pp. 123–132.

(List continued on next page.)

Primary Examiner—Don N. Vo
(74) Attorney, Agent, or Firm—Foley & Lardner

(57) ABSTRACT

A multi-carrier receiver, which may be utilized for receiving MC-CDMA signals, projects the received signal onto each subcarrier and onto a selected number of adjacent subcarriers. The signals resulting from the projection are combined and decoded to provide a decision statistic signal. The decision statistic signal is evaluated to determine an estimated bit value over each bit length in the transmitted signal. The receiver exploits the effects of imperfections in the communications channel such as fast fading, Doppler and frequency offsets and phase noise, to account for the dispersion of signal energy from a subcarrier to one or more adjacent subcarriers.

30 Claims, 18 Drawing Sheets

OTHER PUBLICATIONS

Jean Armstrong, "Analysis of New and Existing Methods of Reducing Intercarrier Interference Due to Carrier Frequency Offset in OFDM," IEEE Trans. Commun., vol. 47, No. 3, Mar. 1999, pp. 365–369.

Xiang Gui, et al., "Performance of Asynchronous Orthogonal Multicarrier CDMA System in Frequency Selective Fading Channel," IEEE Trans. Commun., vol. 47, No. 7, Jul. 1999, pp. 1084–1091.

Luciano Tomba, et al., "Sensitivity of the MC–CDMA Access Scheme to Carrier Phase Noise and Frequency Offset," IEEE Trans. Veh. Tech., vol. 48, No. 5, Sep. 1999, pp. 1657–1665.

Patrick Robertson, et al., "Analysis of the Loss of Orthogonality through Doppler Spread in OFDM Systems," Proc. Globecom'99, IEEE, Brazil, Dec. 1999, pp. 701–706.

Srikrishna Bhashyam, et al., "Time–Selective Signaling and Reception for Communication over Multipath Fading Channels," IEEE Trans. Commun., vol. 48, Jan. 2000, pp. 83–94.

Ronald A. Iltis, "Decorrelator Detection for Quasi–Synchronous Multicarrier CDMA," Milcom 97 Proceedings, Nov. 3–5, 1997, Annual Military Communications Conference, IEEE, New York, 1997, pp. 863–866.

* cited by examiner

METHOD AND SYSTEM FOR MULTI-CARRIER MULTIPLE ACCESS RECEPTION IN THE PRESENCE OF IMPERFECTIONS

STATEMENT OF GOVERNMENT RIGHTS

This invention was made with United States government support awarded by the following agency: NSF 9875805. The United States government has certain rights in this invention.

FIELD OF THE INVENTION

This invention pertains generally to the field of communication systems and particularly to multi-carrier code-division multiple access and time division multiple access wireless communication systems.

BACKGROUND OF THE INVENTION

There is an ever increasing demand for higher data rates in wireless communication systems. Future wireless personal communications services will require higher bandwidths than presently available to allow multimedia services to be offered by wireless service providers. A conventional approach to allowing access by multiple users to wireless communication systems is code-division multiple access (CDMA). CDMA systems allow several users to simultaneously and asynchronously access a wireless communications channel by modulating and spreading the information bearing signals from each user utilizing pre-assigned code sequences. Conventional CDMA systems are fundamentally limited in their ability to deliver high data rates due to implementational issues associated with higher chip rates, as well as complexity issues relating to higher Inter-Symbol Interference (ISI). These limitations severely constrain the data rate supportable by single carrier CDMA systems.

Multi-carrier modulation schemes, often referred to as Orthogonal Frequency-Division Multiplexing (OFDM), have the ability to support high data rates while ameliorating ISI and fading. The OFDM modulation scheme splits the high rate data stream into a number of parallel, lower rate data streams that are transmitted over narrow band orthogonal subcarriers. The longer symbol duration of the lower rate data stream significantly reduces the effects of ISI. Using such schemes, ISI can be eliminated by adding a guard time (often called a cyclic prefix) between the different symbols that is larger than the multi-path spread experienced by each narrow band channel. An attractive aspect of OFDM is that its modulation and demodulation can be implemented efficiently by the Discrete Fourier Transform (DFT).

A multi-carrier CDMA scheme (MC-CDMA) has been proposed which is based on the combination of CDMA and OFDM to support higher data rates in CDMA systems. See, K. Fazel, et al., "On the performance of convolutionally-coded CDMA/OFDM for mobile communication systems," Proc. IEEE PIMRC, September 1993, pp. 468–472; J. P. L. N. Yee, et al., "Multicarrier CDMA in indoor wireless networks," Proc. IEEE PIMRC, September 1993, pp. 109–113; and E. Sourour, et al., "Performance of Orthogonal Multi-Carrier CDMA in a Multi-Path Fading Channel," IEEE Trans. Commun. Vol. 44, March 1996, pp. 356–367. The lower data rate supported by each subcarrier is manifested in longer symbol and chip durations. Hence, the MC-CDMA system encounters reduced ISI and frequency selectivity. In a properly designed MC-CDMA system, each single subchannel encounters flat fading, thereby eliminating the need for channel equalization. Furthermore, such systems exploit frequency selective fading for diversity through the different subcarriers. MC-CDMA also requires lower speed parallel-type digital signal processing to deliver system performance comparable to single-carrier CDMA systems, which require a fast serial-type signal processing. These important features make MC-CDMA a strong candidate for future high rate wireless communication systems.

Although the OFDM scheme is robust with respect to ISI, its performance and ease of implementation critically depends on orthogonality between subcarriers. The non-ideal system characteristics encountered in practice destroy the orthogonality between the different subcarriers. These non-ideal conditions include frequency offsets and phase noise, due to the inefficiency of the transmitter and/or the receiver, as well as Doppler effects due to fast fading. MC-CDMA systems are more sensitive to these imperfections than single-carrier CDMA (SC-CDMA) systems because of the longer symbol durations in MC-CDMA systems. For example, the communications channel may appear almost constant over one (relatively short) symbol duration in a SC-CDMA system, but may exhibit faster fading over one (relatively long) symbol duration in a MC-CDMA system. Loss of orthogonality between the different subcarriers is due to the dispersion of signal power in a particular subcarrier into adjacent frequencies. This also results in leakage between subcarriers, causing Inter-Carrier Interference (ICI) that further degrades performance. Since existing MC-CDMA receivers process each subchannel separately, they collect only part of the transmitted power in each carrier, in addition to suffering from ICI. The degradation in performance due to these imperfections has severely limited the practical use of MC-CDMA. See, e.g., P. Robertson, et al., "Analysis of the Loss of Orthogonality Through Doppler Spread in OFDM Systems," Proc. GLOBECOM 99, IEEE, Brazil, December 1999, pp. 1–10; L. Tomba, et al., "Sensitivity of the MC-CDMA Access Scheme to Carrier Phase Noise and Frequency Offset," IEEE Trans. Veh. Technol., Vol. 48, September 1999, pp. 1657–1665.

SUMMARY OF THE INVENTION

In accordance with the invention, reception of multi-carrier signals, such as in MC-CDMA, is carried out in a manner which not only is less sensitive to imperfections in the communications channel and local oscillators, but exploits the effect of some of these imperfections to improve the accuracy of the received and decoded data even relative to an ideal system without any imperfections. The receiver exploits fast fading to achieve a higher level of diversity to combat fading, and fully compensates for Doppler and frequency offsets as well as phase noise, thereby eliminating the performance loss due to these factors.

The multi-carrier receiver and the method in accordance with the invention accounts for the dispersion of signal energy from a subcarrier to one or more adjacent subcarriers that results from imperfections such as fast fading, Doppler and frequency offsets, and phase noise. If the communications channel were perfect, and none of these effects occurred, each subcarrier frequency received by the receiver would contain only the information that was transmitted at that subcarrier frequency by the transmitter. However, under practical conditions, such as in mobile wireless communications systems and due to imperfections in local oscillators, the communications channels are not perfect, and data information encoded on one subcarrier frequency will disperse to other subcarriers. As a result, the conventional detection of each subcarrier separately may be contaminated and degraded, potentially yielding erroneous decoded data. In the present invention, the information originally encoded on a particular subcarrier that has spread to other subcarriers is recovered in the receiver by jointly processing both the specific subcarrier and at least one adjacent subcarrier to provide a combined signal which recovers all the signal energy that is not captured by the specific subcarrier by itself, and then decoding the combined signal to provide an improved estimate of the bit value that was encoded on the subcarrier at the transmitter.

In a multi-carrier receiver of the invention that may be utilized for receiving MC-CDMA signals, decoding is carried out for each subcarrier frequency in the received signal by projecting the received signal onto the subcarrier and onto one or more selected adjacent subcarriers. The signals resulting from the projection are combined and decoded to provide a detection statistic signal. The detection statistic signal is evaluated to determine an estimated bit value over each bit length in the transmitted signal. The estimated bit value is evaluated as the sign of the real part of the detection statistic over each bit length. The decoder for each user applies a decoding sequence for that user across different detection statistics that decodes selected encoded information in the transmitted signal on the communications channel. For example, where several users are utilizing the communications channel, as in wireless communications, each user will be assigned a distinct code so that the encoded signals of the various users are orthogonal. The transmitter encodes the several subcarriers with the particular user's code, and the receiver for that user utilizes that code to decode the detected signal information.

The invention may also be incorporated in a modified MC-CDMA communication system in which the original data at the transmitter is converted from serial data having a bit length T to M parallel bits, each having a bit length MT. These multiple bits are then encoded in accordance with the user's code onto multiple subcarriers. The received signal is detected by the receiver for each subcarrier in the transmitted signal to provide M estimated bits in parallel, which may then be converted from parallel to serial data at the output of the receiver.

In an MC-CDMA communication system, the transmitter may utilize subcarriers separated from each other in frequency by 1/T, where T is the bit duration, or the subcarriers may be separated in frequency by 2/T. In the former case, the receiver utilizes a decoder for each subcarrier frequency in the transmitted signal. In the latter case, the receiver may utilize joint processing only of adjacent subcarrier frequencies for subcarriers that are actually transmitted (the "active" subcarriers), or may process the adjacent active subcarriers and also the so-called "inactive" subcarriers, that are at frequencies between the frequencies of the active subcarriers, to improve the accuracy of the data provided from the receiver at the cost of slightly higher complexity.

The number of adjacent subcarriers around a particular subcarrier on which the received signal is projected is preferably selected in accordance with the type of imperfection in the communications channel that is encountered. Generally, most of the signal information will be concentrated in a few adjacent subcarriers, typically five or less above and below the frequency of the subcarrier frequency for that specific decoder. Generally, in the presence of imperfections, the received signal is preferably projected onto at least one subcarrier above or one subcarrier below the subcarrier frequency for the specific decoder.

Further objects, features and advantages of the invention will be apparent from the following detailed description when taken in conjunction with the accompanying drawings.

DETAILED DESCRIPTION OF THE INVENTION

Figure 1:
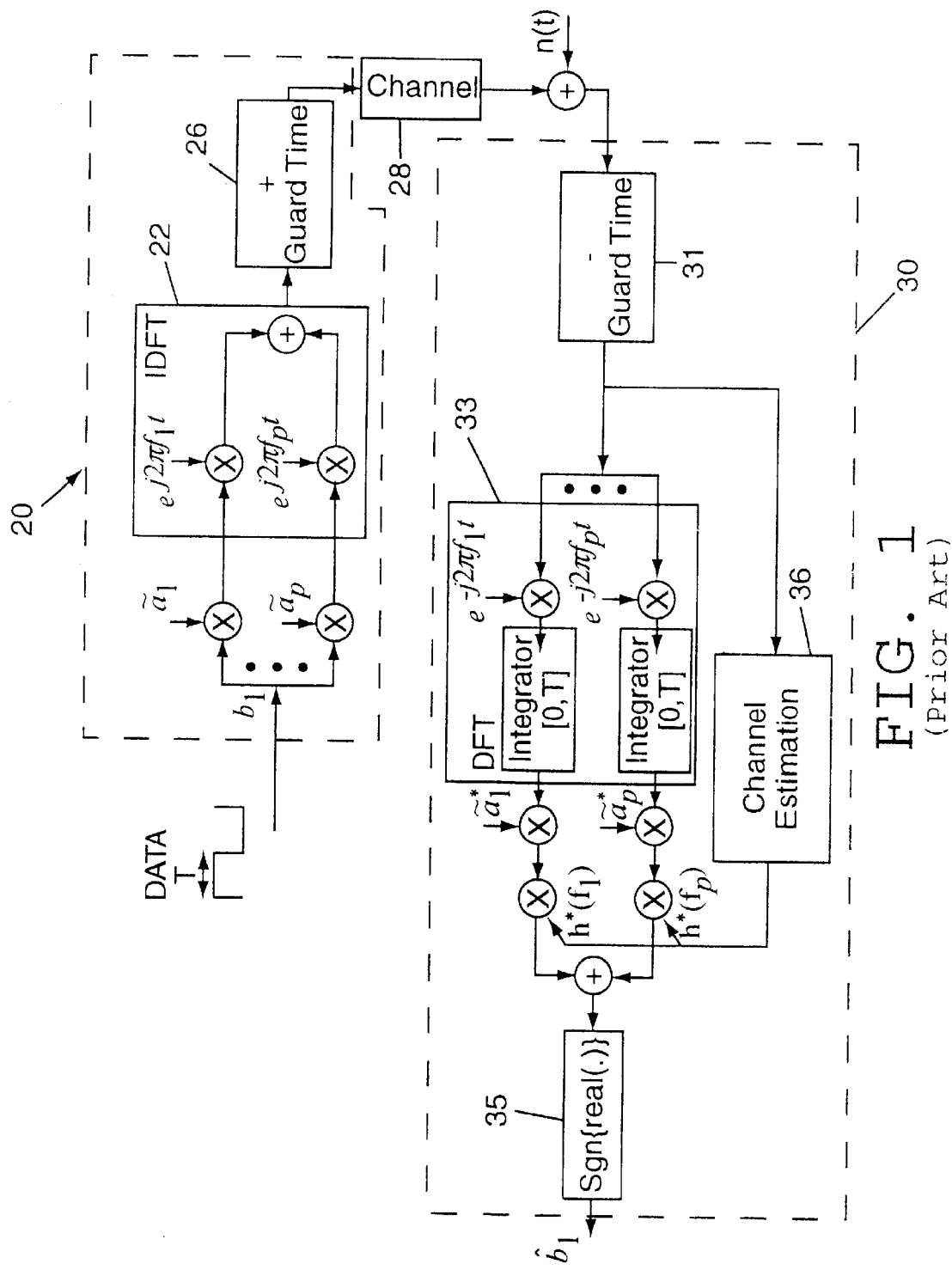
FIG. 1 is a block diagram of a conventional MC-CDMA communication system.

In direct sequence CDMA (DS-CDMA), the transmitted data bit with duration T is spread by a signature code so that the signal occupies the whole bandwidth B. FIG. 1 shows a typical MC-CDMA system. In the transmitter 20 of a MC-CDMA system, the signature code $\{\alpha_p, p=1,2, \ldots, P\}$ is spread among a set of P orthogonal subcarriers each carrying the same information bit $b_i$. Thus, each chip modulates one of P orthogonal subcarriers. This process is done through a P-point DFT block 22.

The subcarriers are separated by $$\frac{1}{T}$$

and the spectrum associated with each subcarrier is $$B_o = \frac{2}{T}.$$

Figure 2:
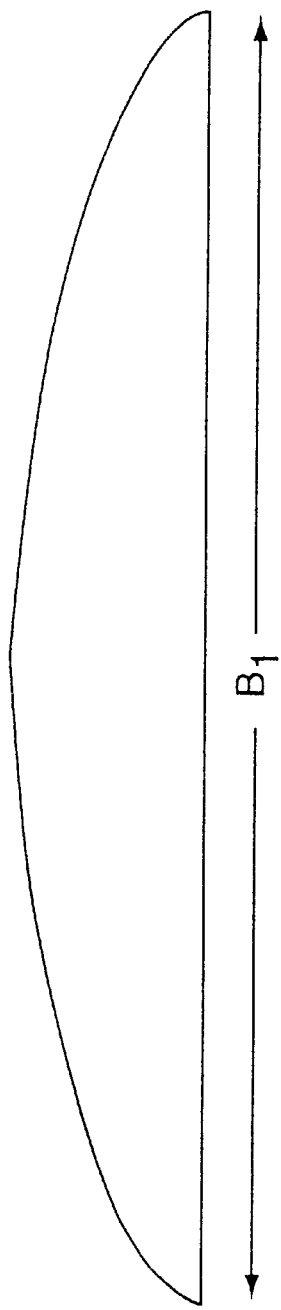
FIG. 2 is a graph illustrating the spectrum of an SC-CDMA signal.
Figure 3:
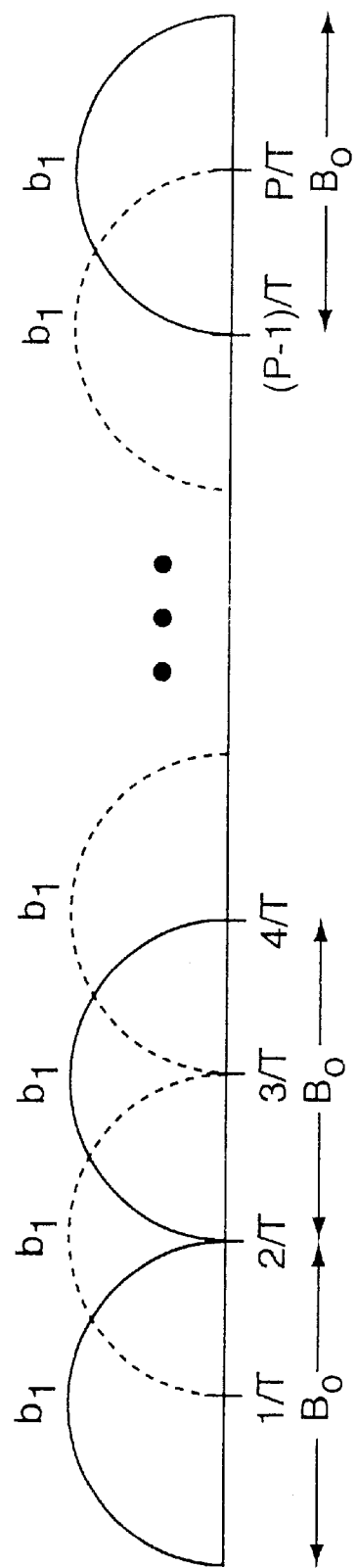
FIG. 3 is a graph illustrating the spectrum of an MC-CDMA signal.

In general the different spectra overlap. A guard time is often added, as shown at the block 26 in FIG. 1, to reduce the effects of ISI. FIGS. 2 and 3 show the spectrum of an SC-CDMA and that of an MC-CDMA signal, respectively. The idea behind MC-CDMA is to transmit the data on parallel channels, each occupying a fraction of the bandwidth of the original CDMA signal. The objective is to make the bandwidth of each subband, $B_o$, smaller than the channel coherence bandwidth, defined to be the frequency span over which the different channel samples are strongly correlated, so that each channel encounters flat fading.

Let P=2N−1. Define the set of active subcarriers to be $$f_n = \frac{2n-1}{T},$$

n=1,2, . . . N; these are the subcarriers corresponding to the solid line spectra in FIG. 3. Define also the sets $$\tilde{f}_n = \frac{2n}{T},$$

n=1,2, . . . N−1 to be the set of inactive subcarriers. These are the subcarriers corresponding to the dotted line spectra in FIG. 3. In the following discussion, only the active set are used for data transmission, that is, the data bit is transmitted over N non-overlapping orthogonal subcarriers. A signature code $\{a_n\}$ of length N is employed to modulate the active subcarriers. That is $$\tilde{a}_p = \begin{cases} a_{\frac{p+1}{2}} & \text{for } p \text{ odd} \\ 0 & \text{for } p \text{ even} \end{cases}.$$

The set of inactive subcarriers will not be used in modulation but may be used in detection as it will be clarified later. This choice of inactive subcarriers between active ones is made for simplicity of exposition. The results presented can be readily extended to the case where information is transmitted on all subcarriers.

The transmitted signal on the communications channel 28 (e.g., a wireless broadcast) can thus be written as $$s(t) = b_1 \sum_{n=1}^{N} a_n q(t) e^{j2\pi f_n T} \tag{1}$$

where $$q(t) = \frac{1}{\sqrt{T}} \quad 0 \le t \le T$$

and zero otherwise, is the normalized pulse shape which is assumed rectangular for simplicity. For the multiuser case, a superposition (using different spreading codes for different users) of the signal in (1) is transmitted.

The conventional MC-CDMA receiver 30 shown in FIG. 1 subtracts the guard time from the received signal at block 31. The signal is then fed to DFT block 33 to demodulate the information on the different subcarriers. The signal is then combined with the signature code and the appropriate channel coefficient to provide an estimate of the transmitted bit, $\hat{b}_i$, in accordance with the sign of the combined result at block 35. The channel coefficients are provided via a channel estimator 36 for coherent reception. The channel estimator uses periodically transmitted training symbols or a dedicated pilot channel.

Figure 4:
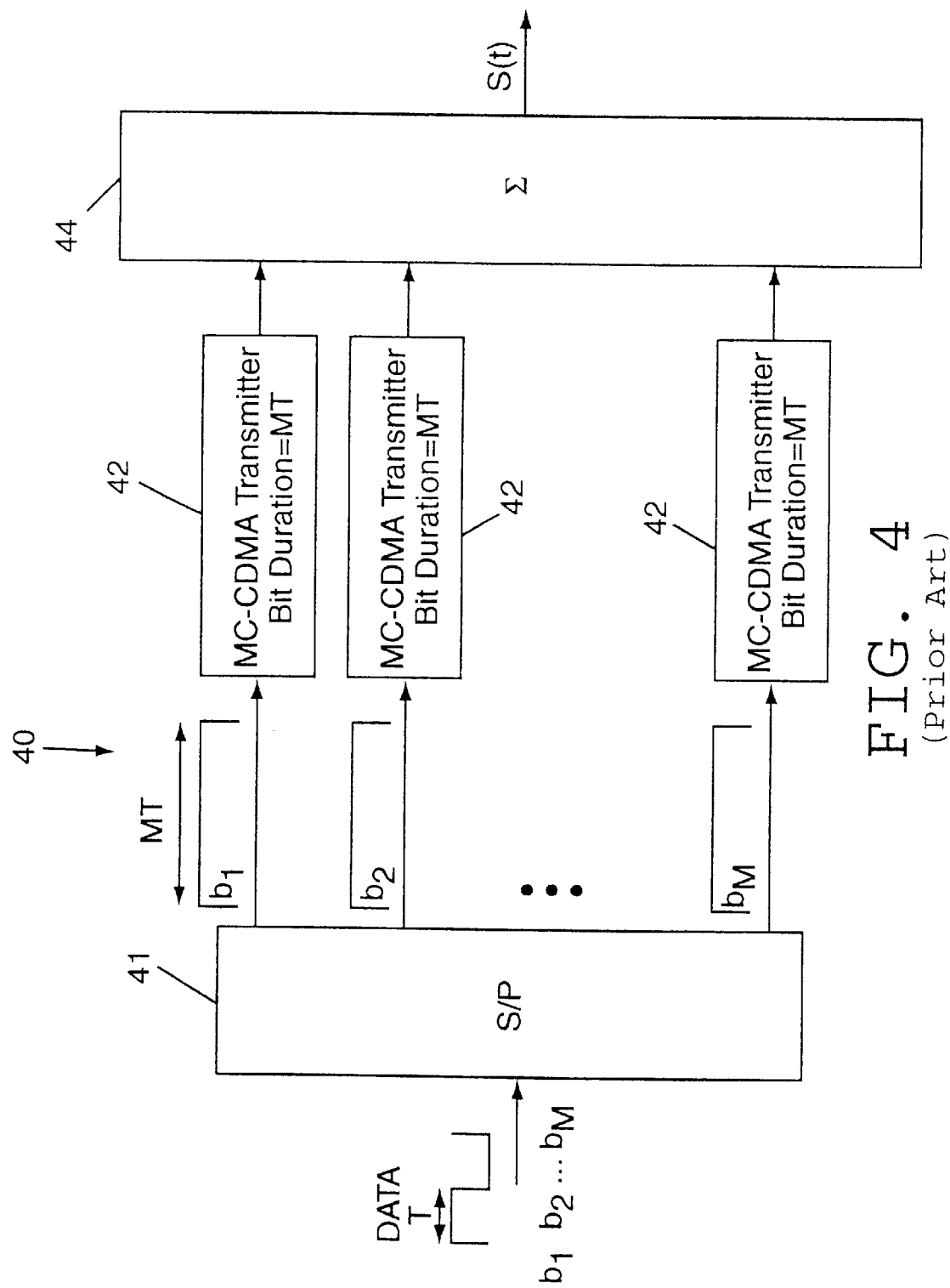
FIG. 4 is a block diagram of a conventional modified MC-CDMA transmitter.
Figure 5:
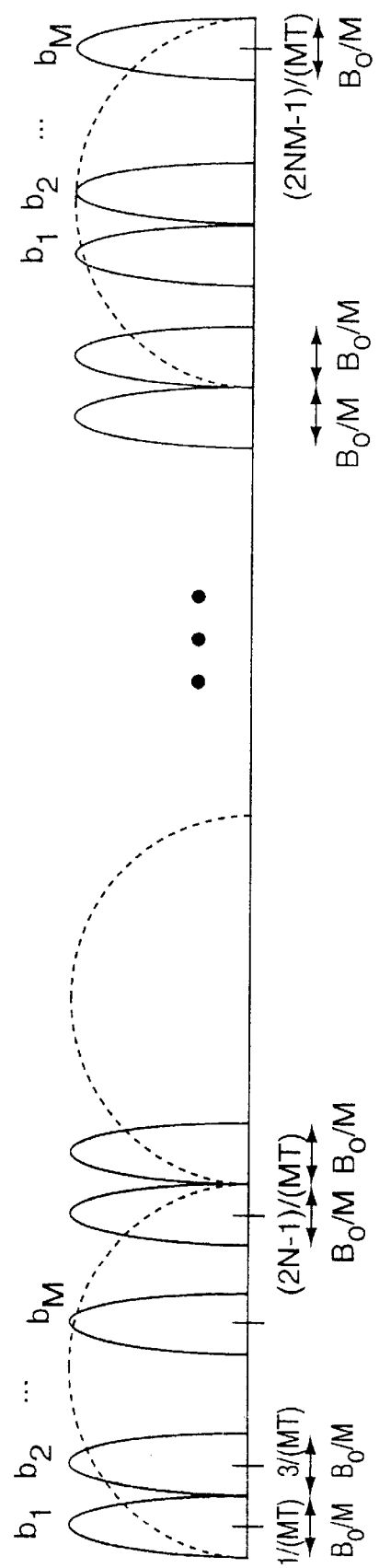
FIG. 5 is a graph illustrating the spectrum of the signal transmitted from the modified MC-CDMA transmitter of FIG. 4.
Figure 6:
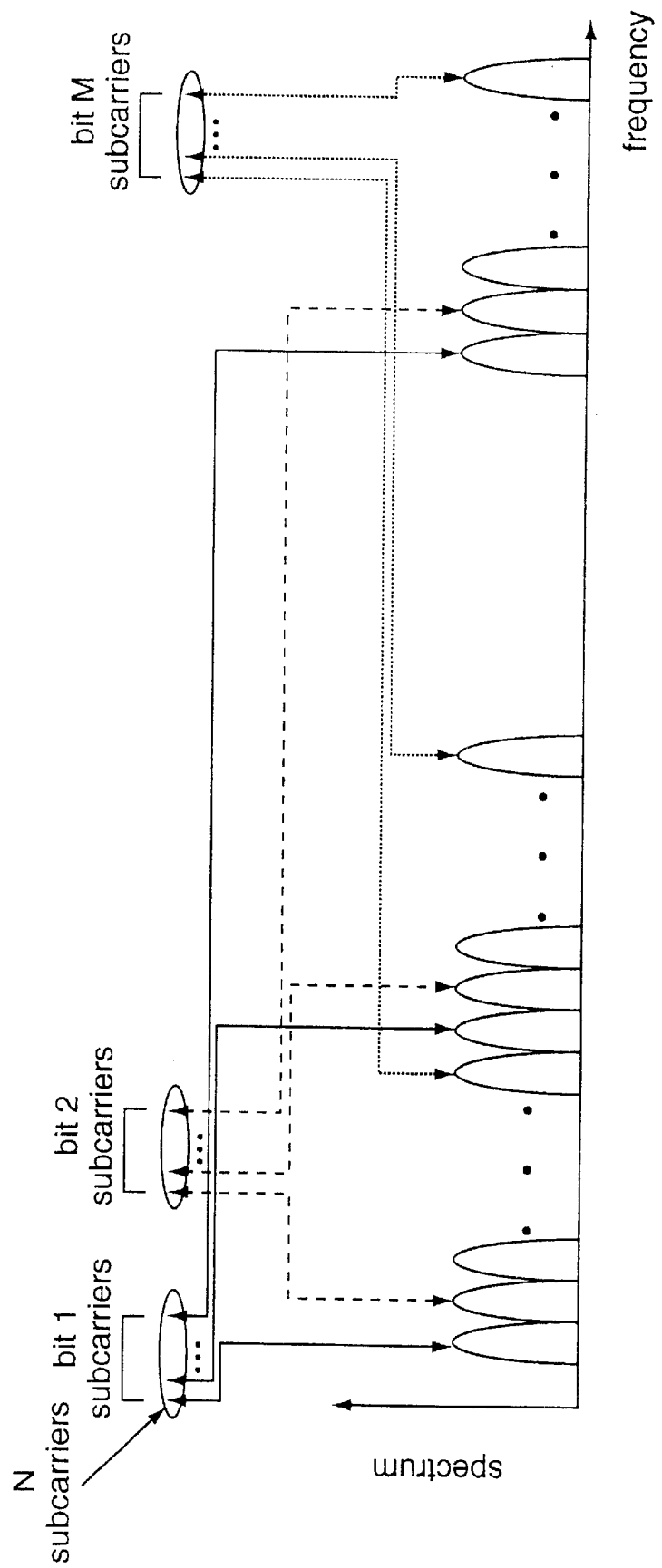
FIG. 6 is a graph of the transmitted signal spectrum as in FIG. 5 which illustrates the interleaving of the subcarriers in the frequency domain for the parallel transmitted bits in the modified MC-CDMA system.

For very high data rates, it is desirable to further increase the symbol duration over each subcarrier to make T>>$T_m$ so that ISI is negligible on each subcarrier, where $T_m$ is the multipath spread of the channel, defined to be the maximum delay encountered by the channel. FIG. 4 shows a conventional modified MC-CDMA transmitter structure that is used at high data rates. In the transmitter 40 of FIG. 4, the data signal is serial-to-parallel converted at block 41 before spreading over the frequency domain. In particular, to increase the symbol duration M times, M data streams need to be transmitted in parallel. Each data stream is transmitted through a MC-CDMA transmitter 42 similar to the one described in FIG. 1 with T replaced by MT. FIG. 5 shows the spectrum of the modified MC-CDMA signal. In order to achieve the same diversity in the frequency domain as that before the modification, the MN active subcarriers need to be interleaved to attain sufficient frequency separation between any two active subcarriers carrying the same bit. FIG. 6 illustrates one carrier assignment, where $$f_{i,n} = \frac{2(i + (n-1)M) - 1}{MT},$$

n=1,2, . . . N, I=1,2, . . . , M, is the $n^{th}$ subcarrier for the $i^{th}$ bit. Using this technique, the rate of the streams fed to the multi-carrier transmitter can be made arbitrarily low, without affecting the overall data rate, to alleviate the effects of ISI. However, dropping the rate on each active subcarrier makes the system more susceptible to various non-idealities, such as frequency offset, phase noise and fast fading. The present invention may be utilized to reduce the effect of these non-idealities both in a basic MC-CDMA system as shown in FIG. 1 as well as with the modified MC-CDMA system of FIG. 4, as discussed further below.

Referring again to FIG. 1 for the basic MC-CDMA system, at the receiver 30 the guard time is removed at 31 and the signal is to a P-point DFT block 33 to reconstruct the OFDM signal. Consider first such a system with no imperfections in a slowly fading channel. Without loss of generality, consider reception of the $0^{th}$ symbol. The received signal can be written as $$r(t) = b_1 \sum_{n=1}^{N} a_n h(f_n) q(t) e^{j2\pi f_n t} + n(t) \tag{2}$$

where $h(f_n)$ is the channel coefficient of the $n^{th}$ subcarrier and n(t) is the Additive White Guassian Noise (AWGN). The test statistic $z_n$ resulting from the projection of r(t) onto the $n^{th}$ active subcarrier (i.e., heterodyne detection with respect to the $n^{th}$ subcarrier frequency $f_n$) is $$z_n = \frac{1}{\sqrt{T}} \int_0^T r(t) e^{-j2\pi f_n t} dt = b_1 a_n h(f_n) + v_n \quad (3)$$

where the second equality follows from the orthogonality of the subcarriers and $$v_n = \int_0^T n(t) e^{-j2\pi f_n t} dt \quad (4)$$

is zero mean Gaussian noise having variance $\Gamma^2$. Note that $\{v_n\}$ are uncorrelated due to the orthogonality of the subcarriers. With perfect channel estimates, the bit decision at block 35 is given by $$\hat{b}_1 = \text{sign}\left[\text{real}\left\{\sum_{n=1}^N a_n^* h^*(f_n) z_n\right\}\right] \quad (5)$$

where $a_n$ is the spreading code and $h(f_n)$ is the channel estimate corresponding to the $n^{th}$ subcarrier. This conventional receiver provides L-fold diversity where $L=\lceil T_m B \rceil$.

In the presence of impairments such as fast fading, Doppler shifts, frequency offset and phase noise, the orthogonality between subcarriers is destroyed. The matched filter test statistic at a given active subcarrier will suffer from leakage from the other active subcarriers. This leakage disperses the energy of a particular subcarrier over the adjacent subcarriers. The present invention addresses these impairments with a universal receiver structure which fully corrects for frequency offsets and phase noise, thereby eliminating the performance loss due to these factors. More importantly, in contrast to existing designs, it exploits temporal channel variations (fast fading) for improved performance via the notion of Doppler diversity. The following discusses the concepts underlying the receiver structure of the invention.

The received signal in the ideal slowly fading channel can be represented in terms of the fixed basis functions, $u^n(t) = q(t)e^{j2\pi f_{is}\, nt}$, $n=1,2,\ldots N$, with $h(f_n)$ as the corresponding expansion coefficients. Under slow fading, $h(f_n)$ is constant over a symbol duration. In the presence of imperfections, the received signal can be generally represented as $$r(t) = b_1 \sum_{n=1}^N a_n w(t, f_n) q(t) e^{j2\pi f_n t} + n(t) \quad (6)$$

where $w(t, f_n)$ is a function that depends on the type of imperfection. In general $$w(t, f_n) = h(t, f_n) e^{j2\pi f_{off} t} e^{jQ(t)} \quad (7)$$

where $h(t,f_n)$ is the time varying channel at $f_n$ due to fast fading, $e^{j2\pi f_{off} t}$ is a term that accounts for the frequency offset between the transmitter and receiver local oscillators, and $e^{jQ(t)}$ is a term that accounts for the phase noise. In this analysis, it is assumed that the phase noise is at the transmitter. The analysis can be easily extended to the case of having the phase noise at the receiver or at both the transmitter and the receiver. The main difference between the ideal system (represented by Eqn. 2) and that with imperfections (represented by Eqn. 6) is that in the system with imperfections the channel coefficients are no longer constant over a symbol duration. Temporal variations are manifested as spectral dispersion—that is, each narrow band subcarrier exhibits a spectral spread around the subcarrier frequency. However, due to the finite symbol duration, any arbitrary spectrum around each subcarrier can be represented in terms of a finite number of discrete frequencies. More specifically, let $\tilde{w}(t,f_n) = w(t,f_n) I_{[0,T]}(t)$ denote the part of $w(t,f_n)$ affecting the $0^{th}$ symbol, where $I_{[x,y]}(t)$ is the indicator function of the interval $[x,y]$. $\tilde{w}(t,f_n)$ admits the following Fourier series representation $$\tilde{w}(t, f_n) = \sum_k c_{k,n} e^{j\frac{2\pi k t}{T}} \quad (8)$$

where $$c_{k,n} = \frac{1}{T} \int_0^T \tilde{w}(t, f_n) e^{-j\frac{2\pi k t}{T}} dt \quad (9)$$

are the random variables representing the effect of the channel and the imperfections. Using the representation in Eqn. 8, the received signal in Eqn. 7 can be written as $$r(t) = b_1 \sum_{n=1}^N \sum_{k=-K_1}^{K_u} a_n c_{k,n} q(t) e^{j\frac{2\pi k t}{T}} e^{j2\pi f_n t} + n(t) \quad (10)$$

where $K_1$ and $K_u$ are integers determined by the type of imperfections. The subscript "1" indicates a subcarrier lower in frequency than a selected subcarrier, and the subscript "u" represents a subcarrier higher in frequency. In general, more than one channel coefficient $c_{k,n}$ is associated with each subcarrier, and the infinite series in Eqn. 8 is replaced by a finite one in Eqn. 10. The reason is that, in all the cases of imperfections discussed herein, the energy of the coefficients is concentrated in only a relatively small finite set $\{c_{k,n}, k=-K_l, \ldots, K_u\}$. In accordance with the invention, the loss in performance is restored and diversity exploited by processing a number of discrete frequencies that correspond to the strong coefficients $c_{k,n}$ in Eqn. 9. Eqn. 10 can be rewritten in terms of the active and inactive subcarriers as follows:

$$r(t) = b_1 \sum_{n=1}^N p_a(n) q(t) e^{j2\pi \frac{2n-1}{T} t} + b_1 \sum_{n=1}^{N-1} p_{ia}(n) q(t) e^{j2\pi \frac{2n}{T} t} + n(t) \quad (11)$$

where $$p_a(n) = \sum_{k=-K_{1,l}}^{K_{1,u}} c_{2k,n-k} a_{n-k} \quad \text{and} \quad (12)$$

$$p_{ia}(n) = \sum_{k=-(K_{2,l}+1)}^{K_{2,u}} c_{2k+1,n-k} a_{n-k}$$

represent the coefficients modulating the active and inactive subcarriers respectively. Here, $K_{1,1}=\kappa(K_1)$, $K_{1,u}=\kappa(K_u)$, $K_{2,1}=\mu(K_1)$, $K_{2,u}=\mu(K_u)$, and $\kappa(K)$ and $\mu(K)$ are defined as $$\kappa(K) = \begin{cases} \frac{K}{2}, & K \text{ is even} \\ \frac{K-1}{2}, & K \text{ is odd} \end{cases} \quad \text{and}$$

$$\mu(K) = \begin{cases} \dfrac{K}{2} - 1, & K \text{ is even} \\ \dfrac{K-1}{2}, & K \text{ is odd} \end{cases}.$$

The representation in Eqn. 11 captures the leakage of information between the different subcarriers. Due to the imperfections, the information transmitted on a particular subcarrier appears on not only that carrier but also on a few adjacent subcarriers as a result of the spectral dispersion. In accordance with the present invention, the received signal, as represented in Eqn. 11, is processed with joint processing of adjacent subcarriers to demodulate information transmitted on each subcarrier; that is, to decode the information of a particular subcarrier $f_n$, in addition to processing $f_n$, $K_1 + K_u$ adjacent subcarriers are also processed, where $K_1$ and $K_u$ are a selected number of lower frequency and higher frequency subcarriers, respectively. Note that $K_1 = K_u = 0$ represents the ideal system with no imperfections.

The general expression for $c_{k,n}$ in the presence of frequency offset, phase noise and a fast fading channel can be expressed as $$c_{k,n} = \frac{1}{T} \int_{-B_d}^{B_d} H(\theta, f_n) G\left(\frac{k}{T} - \theta - f_{off}\right) d\theta \tag{13}$$

where, $$H(\theta, f_n) = FT_{\{t\}}(h(t, f_n)) = \int h(t, f_n) e^{-j2\pi\theta t} dt \tag{14}$$

and $$G(\theta) = \int_0^T e^{jQ(t)} e^{-j2\pi\theta t} dt \tag{15}$$

where $FT_{\{t\}}$ is the Fourier Transform with respect to the variable t. The statistics of the coefficients $\{c_{k,n}\}$ vary with the type of imperfection. In most cases the correlation function of $\{c_{k,n}\}$ $$p(k,n;m,q) = E[c_{k,n} c^*_{m,q}] \tag{16}$$

determines the system performance. $H(\theta, f_n)$ and $G(\theta)$ in Eqn. 13 are statistically independent. Moreover, the channel response for different values of $\theta$ is uncorrelated. Hence, $$p(k, n; m, q) = \tag{17}$$

$$\frac{1}{T^2} \int_{-B_d}^{B_d} E[H(\theta, f_n) H^*(\theta, f_q)] E\left[G\left(\frac{k}{T} - \theta - f_{off}\right) \tilde{H}^*\left(\frac{m}{T} - \theta - f_{off}\right)\right]$$

$$d\theta = \frac{1}{T^2} \int_{-B_d}^{B_d} \psi(\theta, \Delta f) \phi(k - \theta T - f_{off} T, m - \theta T - f_{off} T) d\theta$$

where $\Delta f = f_n - f_q$, $$\psi(\theta, \Delta f) = E[H(\theta, f_n) H^*(\theta, f_q)] \tag{18}$$

$$\phi(\theta_1, \theta_2) = E\left[G\left(\frac{\theta_1}{T}\right) G^*\left(\frac{\theta_2}{T}\right)\right], \tag{19}$$

and where $\phi(x,y)$ is discussed further below.

The present invention may be implemented in a coherent receiver employing Maximal Ratio Combining (MRC). The active and inactive test statistics can be defined to be the projection of the received signal on the active and inactive subcarriers, respectively.

The $n^{th}$ active test statistic can be expressed as $$z_n = \frac{1}{\sqrt{T}} \int_0^T r(t) e^{-j2\pi \frac{2n-1}{T} t} dt = \tag{20}$$

$$b_1 p_a(n) + v_n = b_1 a_n c_{0,n} + b_1 \sum_{k=-K_1, k \neq 0}^{K_1} c_{2k,n-k} a_{n-k} + v_n,$$

while the $n^{th}$ inactive test statistic is $$\tilde{z}_n = \frac{1}{\sqrt{T}} \int_0^T r(t) e^{-j2\pi \frac{2n}{T} t} dt = b_1 p_{ia}(n) + \tilde{v}_n \tag{21}$$

The system performance can be analyzed for three different receiver structures R1, R2, and R3:

R1: This is the conventional receiver that ignores the effect of imperfections. It employs bit detection based only on the first term in the right-hand side of Eqn. 20. Note that the first term is the desired signal component while the second term is the ICI due to imperfections.

R2: This receiver jointly processes only the active subcarriers, and the test statistic is given by Eqn. 20.

R3: This receiver jointly processes both the active and inactive subcarriers, and the test statistic is the combination of Eqns. 20 and 21.

Notice that in absence of imperfections (i.e., $K_1 = K_u = 0$), $z_n = b_1 a_n c_{0,n} + v_n$, and $\tilde{z} = v_n$. The receiver structure R1 is thus optimal in this case because it does not carry out any unnecessary processing. If both active and "inactive" subcarriers are used at the transmitter (the spacing between subcarriers is 1/T), R2 and R3 become identical.

With imperfect estimation of the channel coefficients $\{c_{k,n}\}$, including ideally near-zero coefficients in detection will mainly induce noise. This may affect the system performance. In that case, it is preferred to use exact values of $K_1$ and $K_u$ based on a prior channel knowledge to avoid degradation in performance. Notice that this is not the case when perfect channel estimation is available since extra noise will not be picked due to near zero values of the channel coefficients.

Let us first consider the performance of the three receivers R1, R2 and R3 under the assumption of the presence of only the fast fading imperfection. Hence $w(t, f_n) = h(t, f_n)$. The received signal in fast fading channels admits the same representation as in Eqn. 10 with $K_1 = K_u = \lceil B_d T \rceil$, and $c_{k,n}$ given by $$c_{k,n} = \int_{-B_d}^{B_d} H(\theta, f_n) \text{sinc}\left(\left(\frac{k}{T} - \theta\right) T\right) e^{-j\pi T \left(\frac{k}{T} - \theta\right)} d\theta \tag{22}$$

The correlation function in a fast fading channel is given by $$p(k, n; m, q) = \tag{23}$$

$$e^{-j\pi(k-m)} \int_{-B_d}^{B_d} \psi(\theta, \Delta f) \text{sinc}\left(\left(\frac{k}{T} - \theta\right) T\right) \text{sinc}\left(\left(\frac{m}{T} - \theta\right) T\right) d\theta$$

where $\Delta f = f_n - f_q$ and $\psi(\theta, \Delta f)$ as defined in Eqn. 18. Notice that for a particular subcarrier n, the energy captured by the coefficients (k=m in Eqn. 23) is symmetric in k, i.e., $K_1 = K_u = K$. Note also that the expression in Eqn. 22 is a convolution in $\theta$ between $H(\theta, f_n)$ of a bandwidth $B_d$ and a sinc function with a null-to-null bandwidth $\frac{1}{T}$.

Hence, for a particular n, the energy of the coefficients $\{c_{k,n}\}$ is concentrated in the set $k \in \{-K, \ldots, K\}$ where $K = \lceil B_d T \rceil$.

Despite the smoothing in Eqn. 23, the samples $c_{k,n}$ are uncorrelated for a sufficiently smooth $\psi(\theta, \Delta f)$ in $\theta$. Even if they are not completely uncorrelated, extra diversity is gained as long as they are weakly correlated. Hence, jointly processing the active and inactive test statistics exploits higher diversity due to Doppler effects in addition to collecting dispersed energy.

Since the level of diversity increases with $B_d T$, the modified MC-CDMA shown in FIG. 4 can be used to increase the effective T and, hence, $B_d T$. However, at higher $B_d T$, the number of strong coefficients K increases as well, thereby increasing receiver complexity. For more practical scenarios, most of the energy (and diversity) is captured by $K = \lceil B_d T \rceil = 2$. Note that the conventional receiver R1 does not exploit Doppler diversity, and only receivers R2 and R3 in accordance with the invention attain that due to joint processing.

The receivers R2 and R3 may also be compared to the conventional receiver R1 for situations in which there exists a frequency offset $f_{off}$ between the transmitter and receiver local oscillators (no phase noise). Subcarrier frequency offset causes attenuation of each subcarrier as well as ICI between the different subcarriers. The problem of frequency offset is analyzed below for the two conditions of slow and fast fading channels.

In a slow fading channel, $w(t, f_n) = h(f_n) e^{j2\pi f_{off} t}$. The received signal admits the same representation as with $c_{k,n}$ given by $$c_{k,n} = h(f_n) \text{sin } c(k - f_{off} T) e^{-j\pi(k - f_{off} T)}. \quad (24)$$

Most of the strong coefficients lie in the main lobe of the sinc function. Hence, $$K_1 = \lceil -f_{off} T \rceil \text{ and } K_u = \lceil f_{off} T \rceil \quad (25)$$

From Eqn. 24, the correlation function of the coefficients is given by $$p(k, n; m, q) = e^{-j\pi(k-m)} \psi_{\Delta f}(\Delta f) \sin c(k - f_{off} T) \sin c(m - f_{off} T) \quad (26)$$

where $\Delta f = f_n - f_q$. Eqn. 25 is found to provide a good estimate for the range of strong coefficients. For large frequency offset the received signal corresponding to a given subcarrier is shifted in the vicinity of a different subcarrier. The latter one is then responsible for collecting the dispersed energy.

In this special case of slow fading, the receivers R2 and R3 do not have improved performance over the conventional receiver R1, the ideal MC-CDMA system. However, the receivers R2 and R3 restore the loss in performance encountered by R1 in the presence of offset by collecting the dispersed energy.

For the situation of fast fading channels, it is necessary to account for both the Doppler spread in the channel and the frequency offset between the transmitter and receiver. In this case $w(t, f_n) = h(t, f_n) e^{j2\pi f_{off} t}$ and the new coefficients are given by $$c_{k,n} = \int_{-B_d}^{B_d} H(\theta, f_n) \text{sinc}\left(\left(\frac{k}{T} - f_{off} - \theta\right) T\right) e^{-j\pi T\left(\frac{k}{T} - f_{off} - \theta\right)} d\theta. \quad (27)$$

Following the same analysis as above, $$K_1 = \lceil B_d T - f_{off} T \rceil \text{ and } K_u = \lceil B_d T + f_{off} T \rceil$$

The correlation function of the coefficients is given by $$p(k, n; m, q; f_{off}) = e^{-j\pi(k-m)} \quad (28)$$
$$\int_{-B_d}^{B_d} \psi(\theta, \Delta f) \text{sinc}\left(\left(\frac{k}{T} - f_{off} - \theta\right) T\right) \text{sinc}\left(\left(\frac{m}{T} - f_{off} - \theta\right) T\right) d\theta.$$

A slow fading channel may also be subject to phase noise. The performance of the conventional OFDM systems degrades severely in the presence of phase noise and frequency offset. Due to the fact that the inter-carrier spacing in OFDM is relatively small, OFDM transceivers are somewhat more sensitive to these imperfections in comparison to single carrier (SC) systems. Phase noise is a potentially serious problem because of the common need to employ relatively low cost tuners in the receivers. Low cost tuners are associated with poor phase noise characteristics; that is, their output spectrum is appropriately a delta surrounded by noise with certain spectral characteristics. The receivers of the present invention are well suited to also solve the problem of phase noise.

In the presence of phase noise at the transmitter, the received signal can be expressed as $$r(t) = \quad (29)$$
$$b_1 \sum_{n=1}^{N} a_n h(f_n) q(t) e^{j2\pi \frac{2n-1}{T} t} e^{jQ(t)} + n(t) = b_1 x(t) e^{jQ(t)} + n(t)$$

where $Q(t)$ is modeled as a continuous-path Brownian motion (or Wiener-Levy) process with zero mean and variance $2\pi B_0 t$. Under the knowledge of $Q(t)$, the optimal decision statistic can be written as $$\zeta = \int_0^T x^*(t) e^{-jQ(t)} r(t) dt = b_1 \int_0^T |x(t)|^2 dt + \int_0^T x^*(t) n(t) dt. \quad (30)$$

Thus, the optimal detector will cancel the effects of phase noise. If the phase noise is in the receiver, $e^{jQ(t)}$ will appear in both the signal and noise terms of Eqn. 27. The optimal pre-whitened detector (under the knowledge of $Q(t)$) will again cancel the effects of phase noise. In either case, the optimal receiver restores the performance loss due to phase noise.

We illustrate the receiver of the present invention in the presence of phase noise in slowly fading channels for simplicity. Extensions to include fast fading and frequency offsets can be incorporated through the previous discussions. In this case, $w(t, f_n) = h(f_n) e^{jQ(t)}$, the corresponding coefficients $c_{k,n}$ are given by $$c_{k,n} = \frac{1}{T} h(f_n) \int_0^T e^{jQ(t)} e^{-\frac{j2\pi k t}{T}} dt. \quad (31)$$

The performance can be restored by processing the discrete frequencies in Eqn. 31 as opposed to the continuous processing in Eqn. 30.

$$p(k, n; m, q) = \frac{1}{T^2}\psi_{\Delta f}(\Delta f)\phi(k, m) \quad (32)$$

where $\Delta f = f_n - f_q$, $\psi_{\Delta f}(f_n - f_q)$ is defined as above, $$\phi(x, y) = E\left[G\left(\frac{x}{T}\right)G^*\left(\frac{y}{T}\right)\right] \quad (33)$$

$$= E\left[\int_0^T \int_0^T e^{j(Q(t)-Q(u))}e^{-j\frac{2\pi(xt-yu)}{T}}dt\,du\right]$$

$$= \frac{T^2}{\pi^2}\frac{\gamma(e^{j2\pi(y-x)}-1)}{j(\gamma^2+4x^2)(y-x)} +$$

$$\frac{T^2}{\pi^2}\frac{(\gamma^2-4xy)(e^{-\pi(\gamma-j2y)}-e^{-j2\pi(y-x)}+e^{-\pi(\gamma+j2x)}-1)}{(\gamma^2+4x^2)(\gamma^2+4y^2)} + \quad (34)$$

$$\frac{T^2}{\pi^2}\frac{j2\gamma(x+y)(e^{-\pi(\gamma-j2y)}+e^{-j2\pi(y-x)}-e^{-\pi(\gamma+j2x)}-1)}{(\gamma^2+4x^2)(\gamma^2+4y^2)}$$

and $\gamma = B_0 T$.
The power of the coefficients can be accordingly (x=y) given by $$\phi(x, x) = \frac{2T^2}{\pi}\left\{\frac{\gamma}{\gamma^2+4x^2} - \frac{(\gamma^2-4x^2)}{\pi(\gamma^2+4x^2)^2} + \right. \quad (35)$$

$$\left. \frac{e^{-\pi\gamma}}{\pi}\left[\frac{(\gamma^2-4x^2)\cos(2\pi\gamma)-4\gamma x\sin(2\pi\gamma)}{(\gamma^2+4x^2)^2}\right]\right\}$$

A special case of Eqn. 34 for integer variables k,m is $$\phi(k, m) = \frac{2T^2}{\pi^2}\frac{(\gamma^2-4km)(e^{-\pi\gamma}-1)}{(\gamma^2+4k^2)(\gamma^2+4m^2)} \quad (36)$$

and the corresponding power at k=m is $$\phi(k, k) = \frac{2T^2}{\pi}\left[\frac{\gamma}{(\gamma^2+4k^2)} - \frac{(\gamma^2-4k^2)(1-e^{-\pi\gamma})}{\pi(\gamma^2+4k^2)^2}\right]. \quad (37)$$

The energy of the coefficients is symmetric around $c_{0,n}$. Hence, $K_1 = K_u = K$. We now consider the choice of K that captures most of the coefficient energy. The energy captured by each $c_{k,n}$ is monotonically decreasing with the integer k. Hence, for every $\epsilon > 0$ there exists an integer K such that $\phi(k,k) < \epsilon$ whenever $k > |K|$. One way to find K is then to ignore the coefficients with energy (relative to $c_{0,n}$) below some threshold $\epsilon > 0$. For large values of $B_0 T$, a larger number of coefficients is needed (large K).

Figure 7:
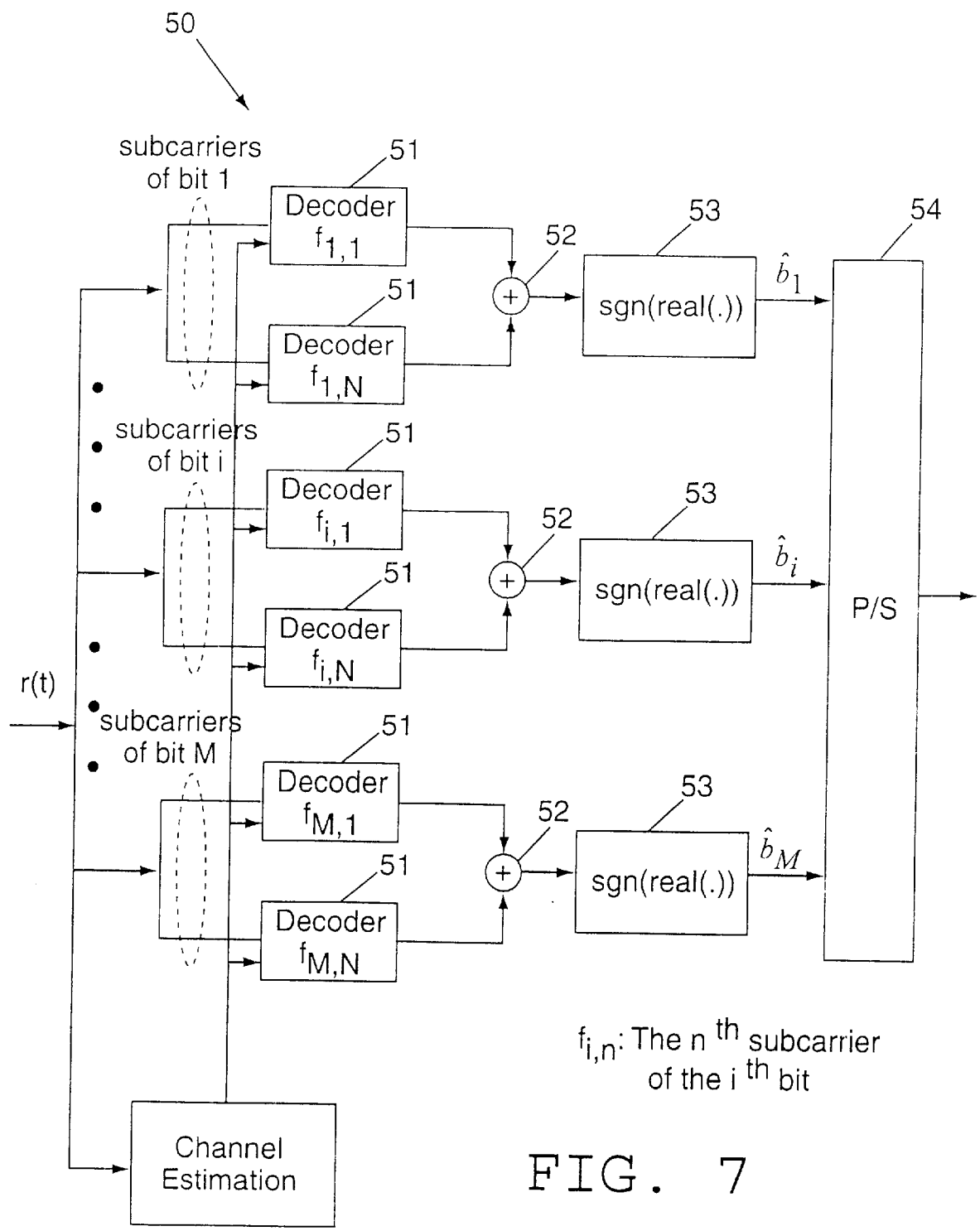
FIG. 7 is a block diagram of a receiver in accordance with the invention that may be utilized for reception of an MC-CDMA signal or a modified MC-CDMA signal.
Figure 8:
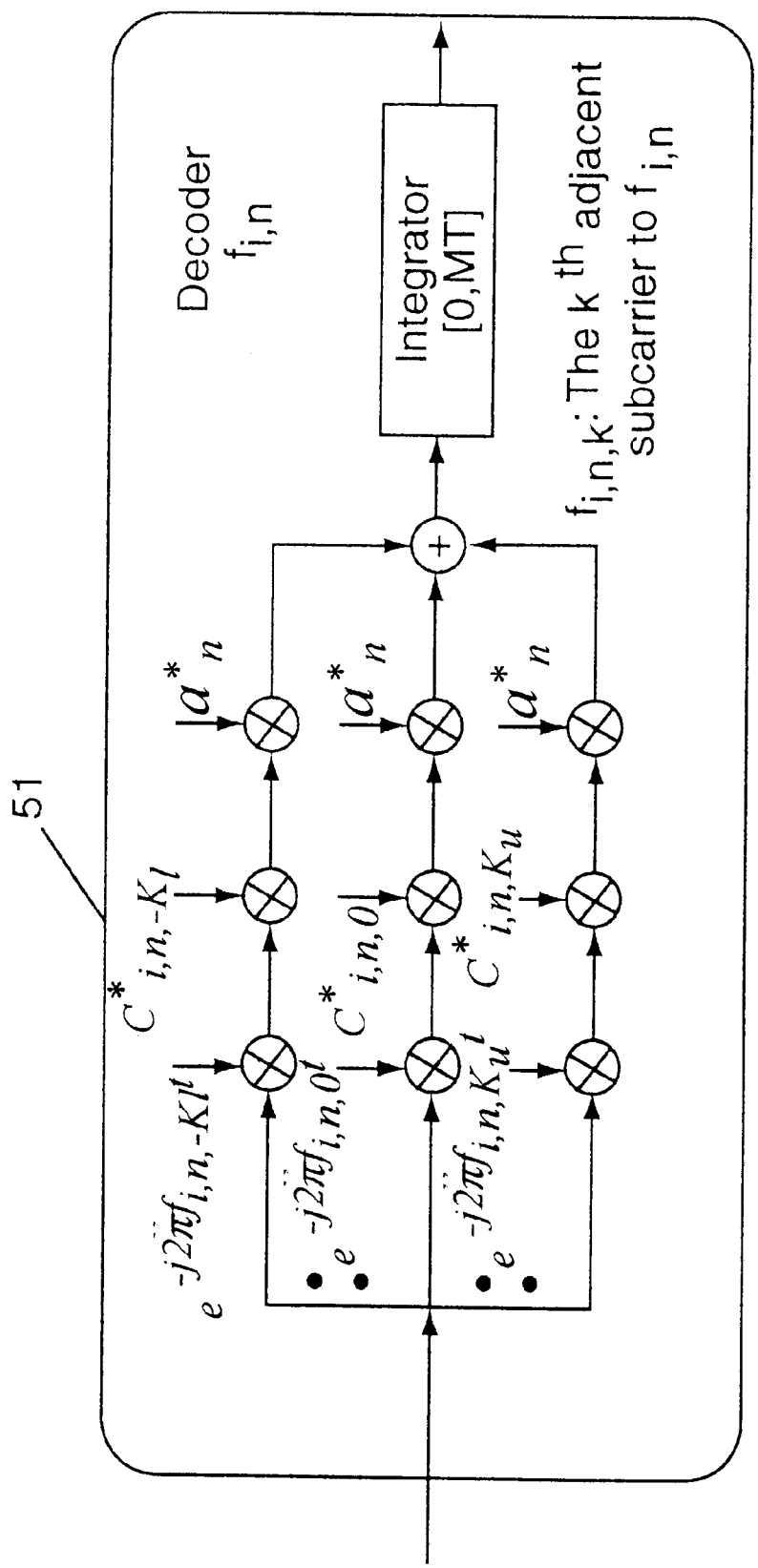
FIG. 8 is a block diagram of the decoder utilized in the receiver of FIG. 7.

The present invention may also be implemented in a receiver for the modified MC-CDMA system having a transmitter as shown in FIG. 4. In this system M bits are simultaneously transmitted each with a duration MT. FIG. 7 shows the receiver structure 50 of the system. In absence of imperfections, to decode the $i^{th}$ bit $b_i$, the received signal is projected over the set of subcarriers corresponding to $b_i$, $f_{i,n}$, n=1,2, ... N, defined above. The resulting test statistics are then combined with the corresponding channel coefficients for detecting $b_i$. This process is done through the $\{f_{i,n}\}$ decoders 51, which may have the structure shown in FIG. 8. The outputs of the decoders 51 for $f_{i,n}$ are then added at 52. A receiver for a conventional MC-CDMA system may have the type of structure as shown in FIGS. 7 and 8, but simplified by having only a single bit path, e.g., bit 1 in FIG. 7, and without the need for parallel to serial conversion.

In the presence of imperfections, the signal corresponding to each subcarrier $f_{i,n}$ is dispersed in the frequency domain. In other words, such signal will have non zero projections over the $K_1 + K_u$ adjacent subcarriers to $f_{i,n}$ for some integers $K_1$ and $K_u$ dictated by the type of imperfection. Define $f_{i,n,k}$, $k = -K_1, K_u$, to be the $k^{th}$ subcarrier adjacent to $f_{i,n}$. Note that $\{f_{i,n,k}\}$ are not distinct for different i and n. In particular, $f_{i,n,k} = f_{\kappa(i,k),\mu(n,k)}$, where (assume $K_1$ and $K_u < M$)

$$\kappa(i, k) = \begin{cases} i+k+m, & i+k \le 0 \\ i+k, & 0 < i+k \le M \\ i+k-M, & i+k > M \end{cases} \text{ and} \quad (38)$$

$$\mu(n, k) = \begin{cases} n-1, & i+k \le 0 \\ n, & 0 < i+k \le M \\ n+1, & i+k > M \end{cases} \quad (39)$$

Define also $c_{i,n,k}$ to be the channel coefficient corresponding to $f_{i,n,k}$. The received signal in the presence of imperfections can be written as $$r(t) = \sum_{i=1}^{M}\sum_{n=1}^{N}\sum_{k=-K_l}^{K_u} a_n c_{i,n,k} e^{j2\pi f_{i,n,k}t} q(t) b_i + n(t) \quad (40)$$

$$= \sum_{i=1}^{M}\sum_{n=1}^{N} p(i, n)e^{j2\pi f_{i,n}t}q(t) + n(t) \quad (41)$$

where, $p(i,n) = \sum_{-K}^{K} c_{\kappa(i,k),\mu(n,k),-k}\alpha_{\mu(n,k)}b_{\kappa(i,k)}$ and n(t) is the Additive White Guassian Noise (AWGN). It is clear from Eqn. 41 that a bit on a particular subcarrier $f_{i,n}$ appears on a subset of subcarriers $\{f_{i,n,k}\}$ with corresponding channel coefficients $\{c_{i,n,k}\}$.

In the receivers of the present invention, the decoder 51 for the carrier $f_{i,n}$ is modified to account for the spectral dispersion due to imperfections. In particular, to decode the information on $f_{i,n}$, the received signal is projected over the set $\{f_{i,n,k}\}$. The test statistic resulting from projecting over $f_{n,k}$ can be written as $$z_{i,n,k} = \frac{1}{\sqrt{T}}\int_0^T r(t)e^{-j2\pi f_{i,n,k}t}dt = c_{i,n,k}a_n b_i + i_{i,n,k} + \eta_{i,n,k} \quad (42)$$

where $i_{i,n,k}$ is an interference term due to the dispersion caused by the imperfections, i.e., the interference resulting from all the information bits other than $b_i$ that modulates $f_{i,n,k}$, and $\eta_{i,n,k}$ is the noise term. Stacking the different test statistics corresponding to $f_{i,n}$, the $f_{i,n}$ test statistic vector can be written as $$z_{i,n} = \begin{cases} z_{i,n,-k} \\ \vdots \\ z_{i,n,o} \\ \vdots \\ z_{i,n,k} \end{cases} = c_{i,n}b_i a_n + i_{i,n} + \eta_{i,n} \quad (43)$$

where $$c_{i,n} = \begin{cases} c_{i,n,-K} \\ c_{i,n,o} \\ c_{i,n,K} \end{cases}, \quad i_{i,n} = \begin{cases} i_{i,n,-K} \\ i_{i,n,o} \\ i_{i,n,K} \end{cases} \text{ and } \eta_{i,n} = \begin{cases} \eta_{i,n,-K} \\ \eta_{i,n,o} \\ \eta_{i,n,K} \end{cases}.$$

For coherent detection, (i.e. assuming the knowledge of $c_{i,n}$ through some channel estimation technique), the decision statistic corresponding to $f_{i,n}$ for Maximal Ratio Combining (MRC) is given by $$\zeta_{i,n} = \sum_{k=-K_l}^{K_u} a_n^* c_{i,n,k}^* z_{i,n,k} \tag{44}$$

Channel estimation may be done in a conventional fashion by transmitting a pilot signal to estimate $c_{i,n,k}$. The overall decision statistic for $b_i$ (i.e. results from combining all the test statistics corresponding to the various $f_{i,n}$) can be written as $$\zeta_i = \sum_{n=1}^{N} \zeta_{i,n} \tag{45}$$

The decision for $b_i$ is then $\hat{b}_i$=sign (real ($\zeta_i$)) implemented at block 53. The parallel data from the blocks 53 may then be converted to a serial data stream in a parallel to serial converter 54.

The modified $f_{i,n}$ decoder in FIG. 8 restores the loss in performance due to imperfections since it collects the dispersed energy in the frequency domain. In the presence of fast fading channels, the receiver exploits the time-varying channels for diversity, hence improving the system performance over receivers operating in slowly fading channels.

For the highest and lowest frequency subcarriers, there are, respectively, no adjacent higher or lower frequency subcarriers. For these subcarriers, the projection may be made on at least one lower frequency subcarrier or at least one higher frequency subcarrier, respectively.

Figure 9:
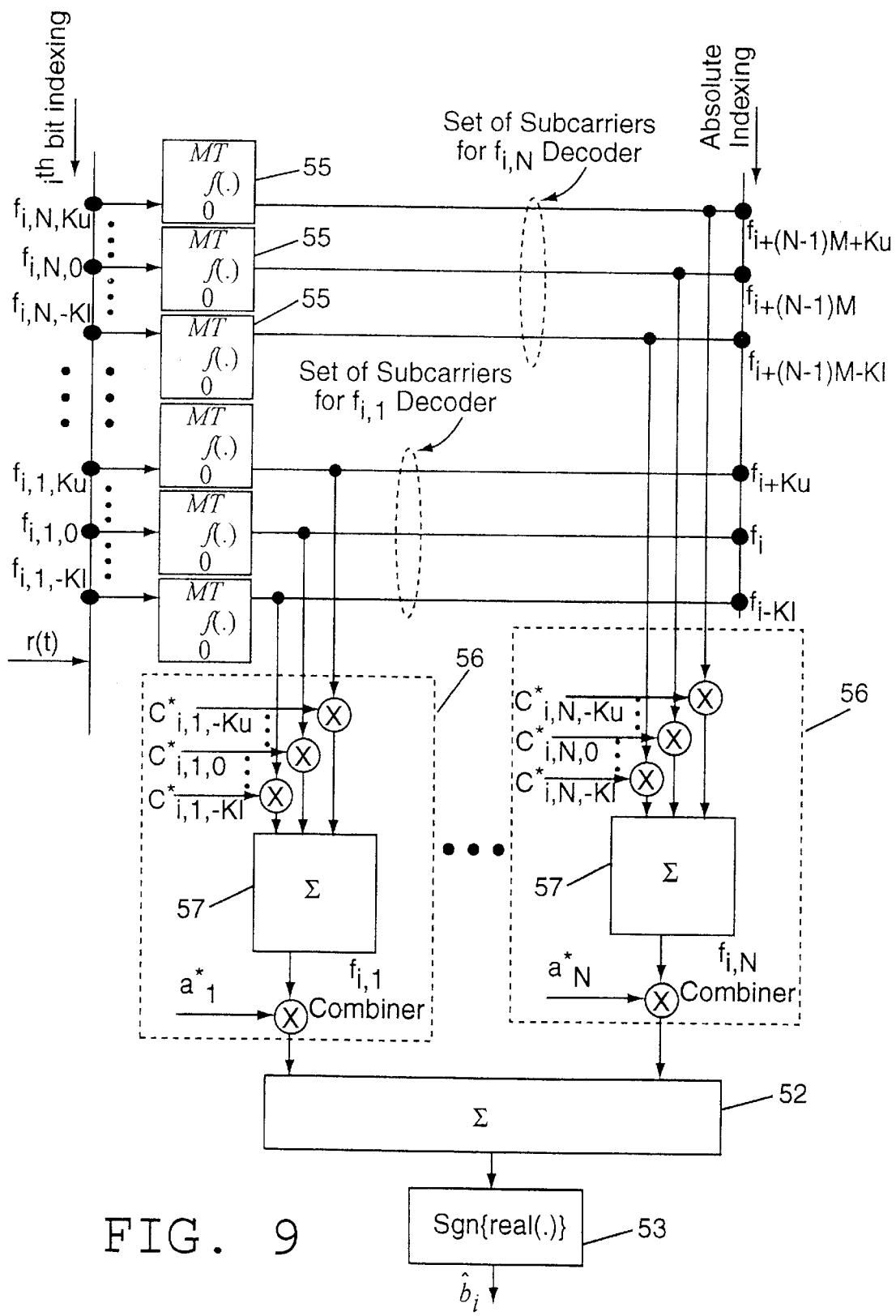
FIG. 9 is a block diagram of a receiver in accordance with the invention that carries out signal processing with reduced redundancy.
Figure 10A:
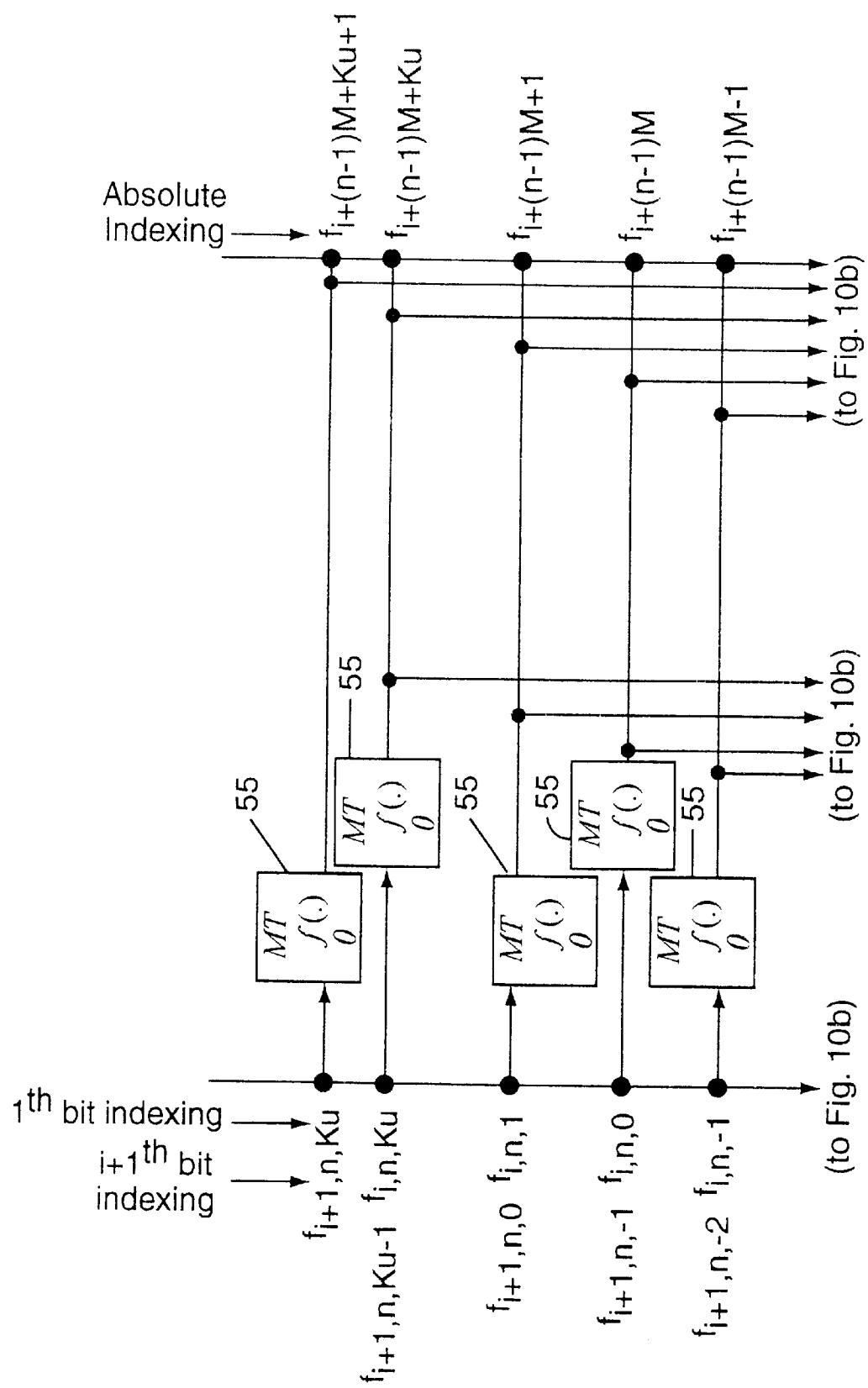
FIG. 10 is a block diagram of the receiver of FIG. 9 showing the processing of two adjacent decoders.
Figure 10B:
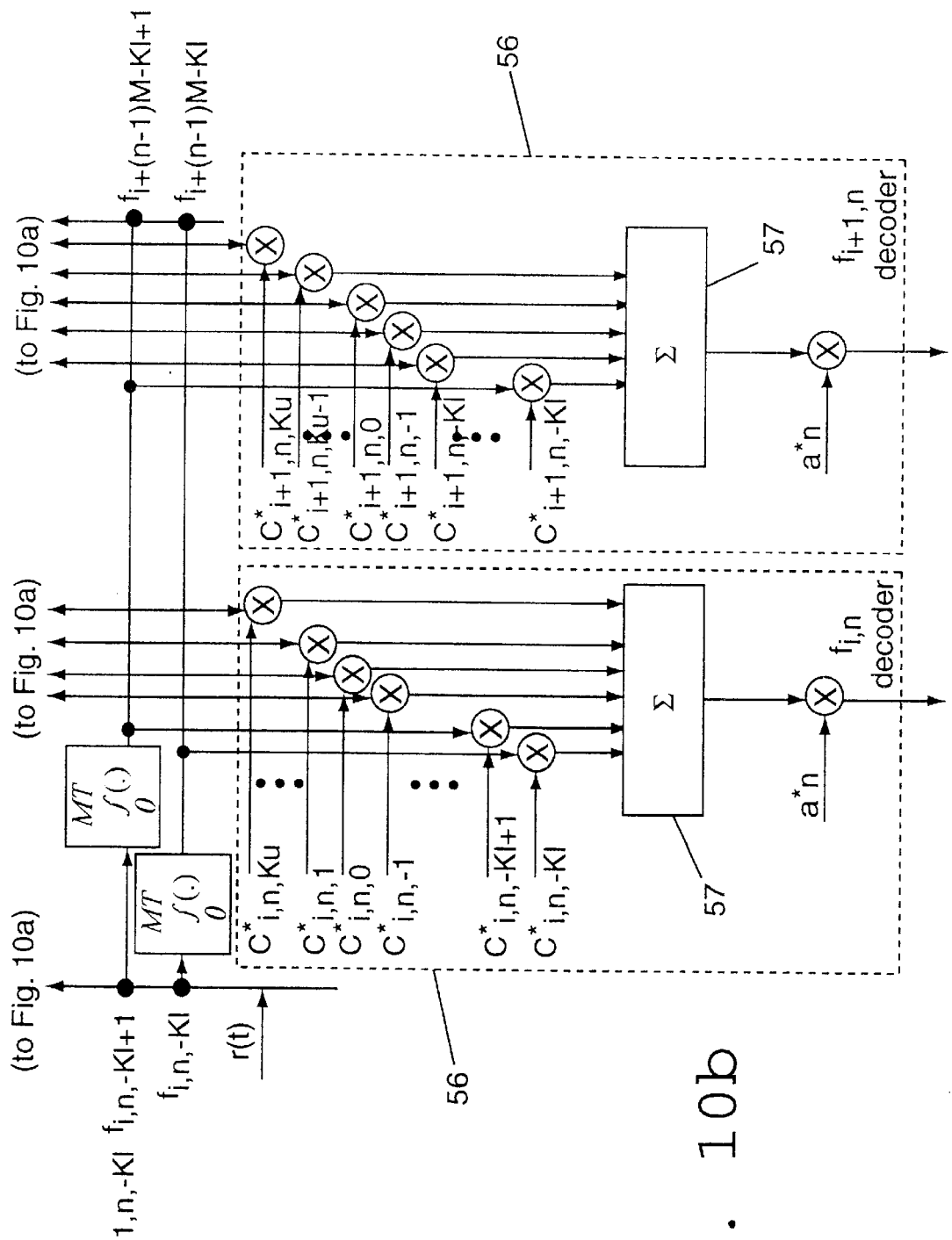

The decoder structure 51 of FIG. 8 as arranged in the receiver 50 of FIG. 7 illustrates the basic concepts of the invention. However, the decoding logic of FIGS. 7 and 8 can be implemented with less redundant processing, as illustrated in FIGS. 9 and 10. With reference to FIG. 9, an implementation of the N decoders corresponding to the $i^{th}$ bit is shown. An initial integration may be carried out at integrators 55 on all the subcarriers, with the appropriate subcarrier signals then being provided to decoders 56 which apply the channel coefficients, sum the results at 57, and apply the signature code to the result of the summation at 57. The output of the decoders 56 is provided to be summed at 52 and the decision for bit $b_i$ is made at 53.

For clarity, FIG. 10 shows the implementation of two adjacent decoders 56, that is, the decoders of $f_{i,n}$ and $f_{i+1,n}$. Basically, this figure shows the test statistics resulting from projecting over the subcarriers $\{f_{i+(n-1)M-K_1}, \ldots, f_{i+(n-1)M+K_u+1}\}$. The test statistics resulting from projecting over $\{f_{i+(n-1)M-K_1}, \ldots, f_{i+(n-1)M+K_u}\}$ are used for the $f_{i,n}$ decoder. On the other hand, the test statistics resulting from projecting over $\{f_{i+(n-1)M-K_1+1}, \ldots, f_{i+(n-1)M+K_u+1}\}$ are used for the $f_{i+1,n}$ decoder.

The receiver of the invention may also be implemented in the third generation CDMA2000 standards. Two spreading options are proposed for the Forward link transmission, namely MC-CDMA and DS-CDMA. In the DS-CDMA system, the symbols are spread using a chip rate of $N_c \times 1.2288$ Mc/s, $N_c=1, 3, 6, 9, 12$, and the spread signal is modulated onto a single carrier. In the multi-carrier approach, the symbols are serial to parallel onto $N_c$ subcarriers (each carrying the same information bit) having a bandwidth of 1.25 MHz each ($N_c=3, 6, 9, 12$) and each subcarrier has a chip rate of 1.2288 Mc/s. This MC-CDMA system is a special case of that described above when M=1 and the same bit is transmitted on a subset of subcarriers. In particular, if the same bit is transmitted on $N_c<N$ subcarriers, then the signal modulating each subcarrier should be spread in time with a code of length N/Nc support the same number of users. FIGS. 2 and 3 show the spectra of the two systems. Performance analysis shows that ideally both DS-CDMA and MC-CDMA have the same performance level; however, the MC-CDMA system has the following advantages:

The ability to incorporate transmitter diversity easily.

The ability to overlay a CDMA2000 system over a CDMAone system in the same spectrum. (CDMAone is a current generation CDMA system based on the CDMA American National Standards Institute (ANSI) TIA/EIA-95-B standards.)

Figure 11:
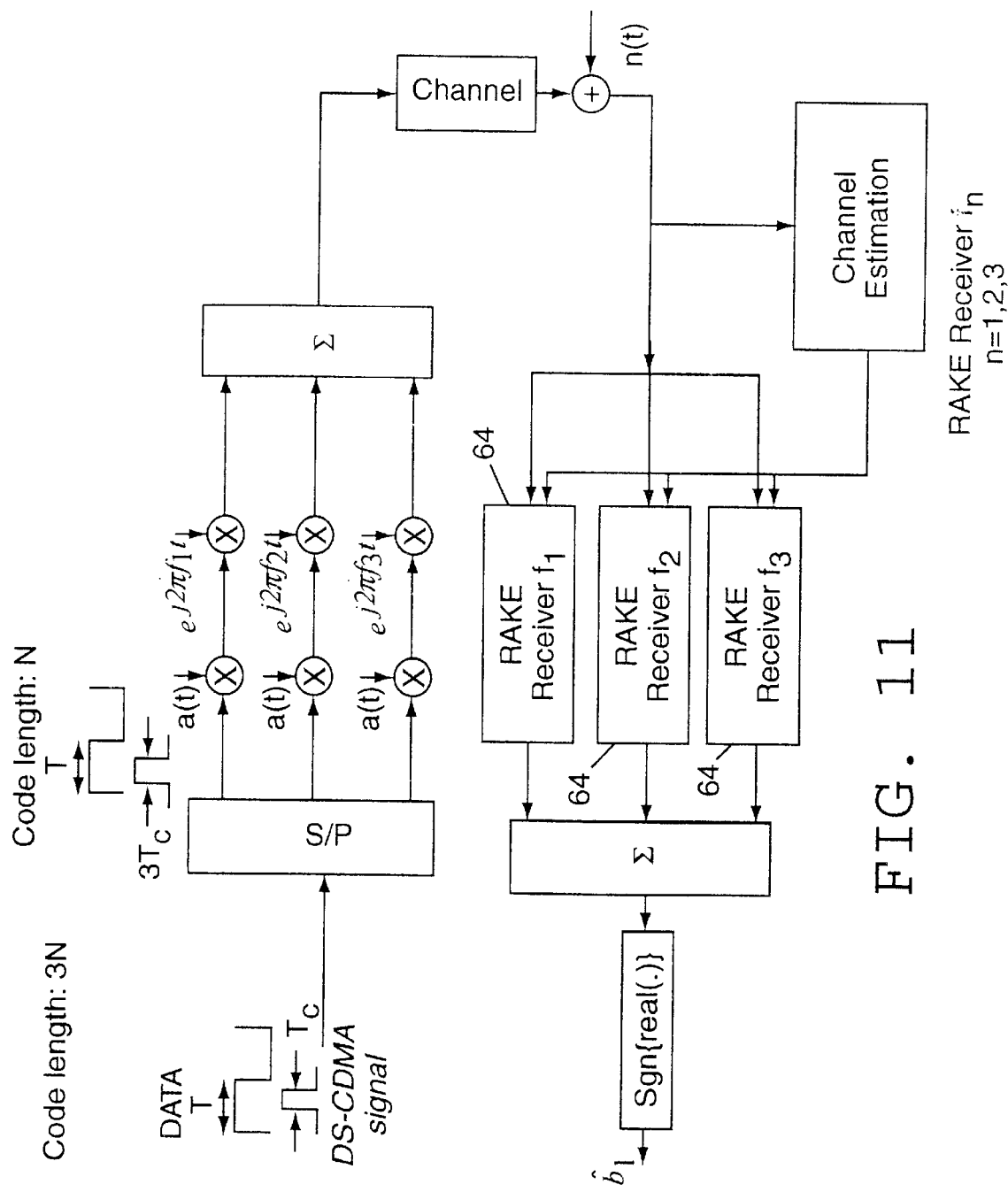
FIG. 11 is a block diagram of a third generation MC-CDMA communication system (for $N_c=3$).
Figure 12:
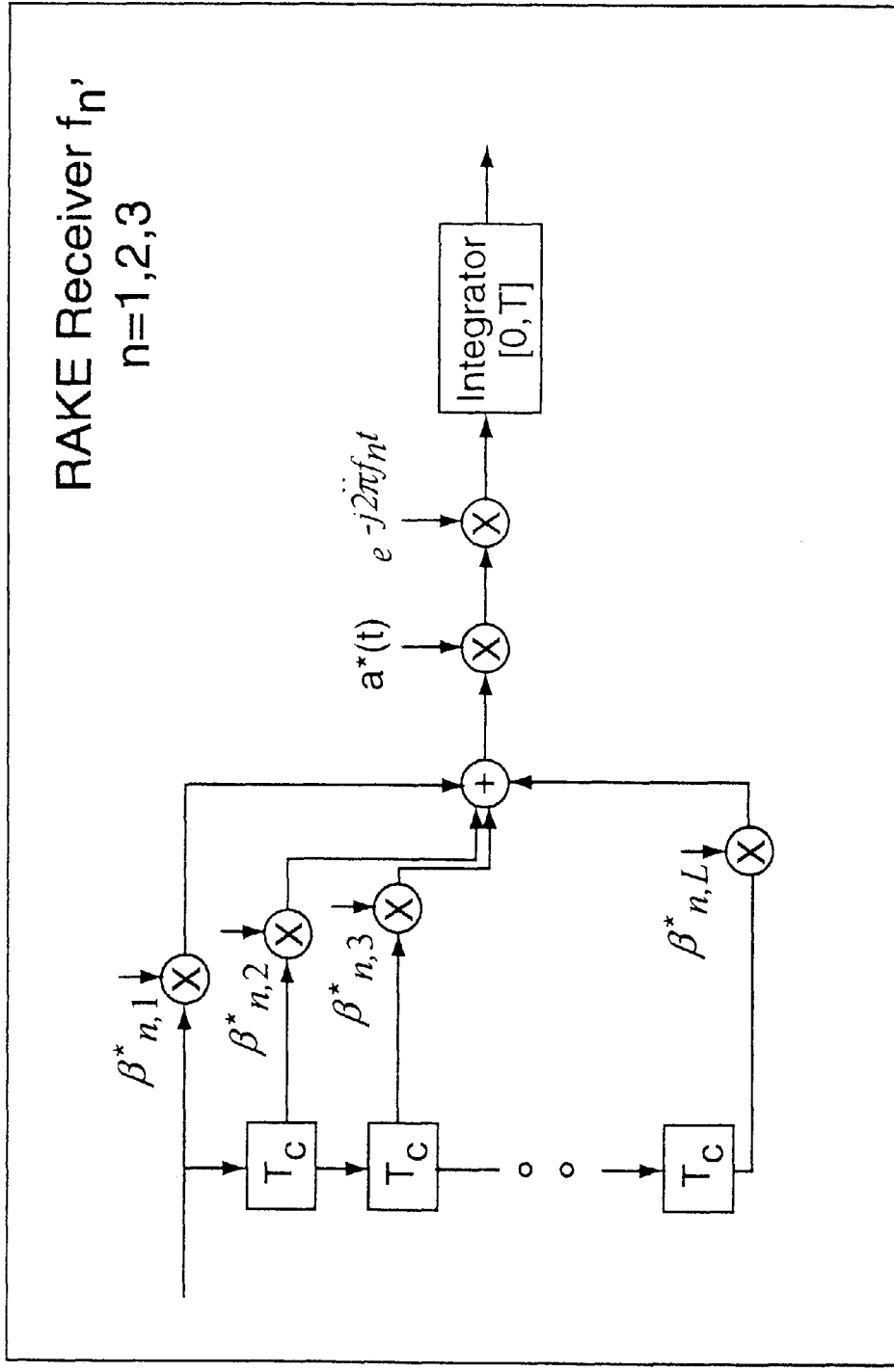
FIG. 12 is a block diagram of the conventional RAKE receiver of the type that has been utilized in prior communication systems as in FIG. 11.

FIG. 11 shows a MC-CDMA transmission system for $N_c=3$. The signature code length in the DS-CDMA system is $N_c$ times that in the MC-CDMA system, i.e. multiplexing on $N_c$ carriers increases the chip duration by $N_c$. Thus, for a data rate of 9.6 Kb/s, the signature code length for the MC-CDMA system is 128 while in the DS-CDMA system it is $N_c \times 128$. We explain the invention for a MC-CDMA with $N_c=3$. Extensions to higher $N_c$ are straight forward. The transmitted signal corresponding to $b_1$ can be written as $$s(t) = b_1 \sum_{n=1}^{3} a(t) e^{j2\pi f_n t} \tag{46}$$

where $a(t)$ is the signature waveform corresponding to a code for the user of length $N/N_c$, and $f_n$, n=1, 2, 3 are the subcarriers used for transmission. The received signal in absence of imperfections can be written as $$r(t) = b_1 \sum_{n=1}^{3} \sum_{l=1}^{L} \beta_{n,l} a(t - \tau_1) e^{j2\pi f_n t} + n(t) \tag{47}$$

where L is the number of multipaths, $\beta_1$ and $\tau_1$ are the complex channel gain and path delay, respectively corresponding to the $1^{th}$ path. As seen in FIG. 11, a RAKE receiver 64 with MRC is used at each subcarrier to exploit the multipath diversity in the channel. The RAKE receiver is described in; e.g., J. G. Proakis, *Digital Communications*, (book), McGraw-Hill, New York, 3d Ed., 1995. The RAKE receiver compensates for the paths delay and combines each path with its complex gain. The signal is then despread by the code $a(t)$ and integrated over a period of T to generate the test statistic corresponding to each subcarrier. FIG. 12 shows the details of the conventional RAKE receiver corresponding to each subcarrier. The decision statistic (after RAKE reception) corresponding to $f_n$ can be written as $$z_n = b_1 \sum_{l=1}^{L} |\beta_{n,1}|^2 + \eta_n \tag{48}$$

where $\eta_n$ is the noise sample. The different decision statistics corresponding to the different subcarriers are added to generate the overall decision statistic for $b_1$.

Figure 13:
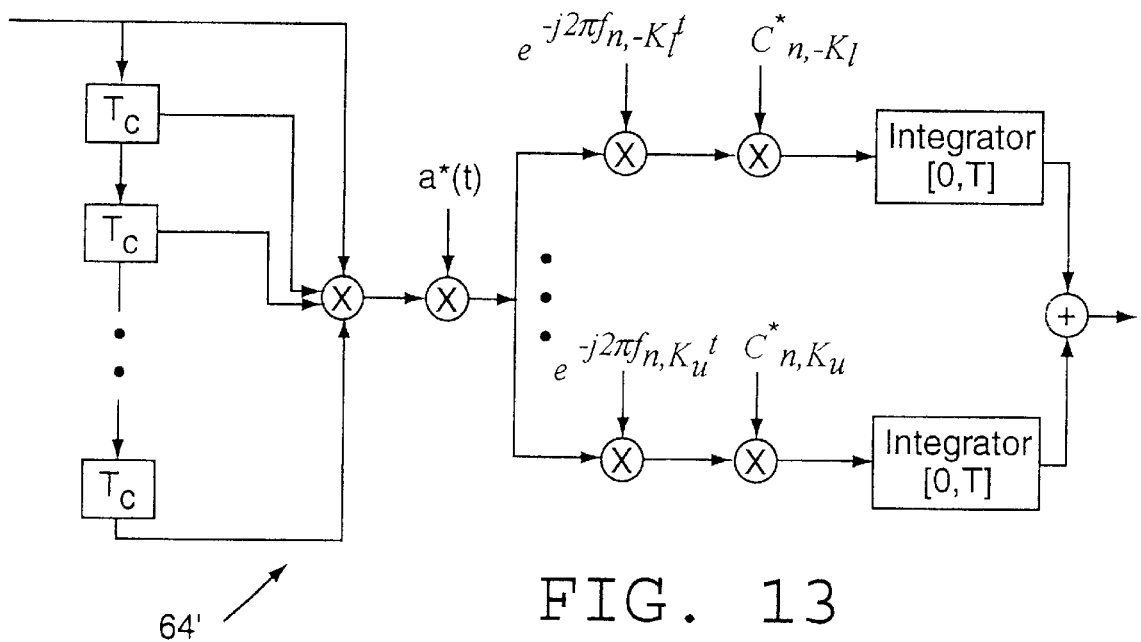
FIG. 13 is a block diagram of a RAKE receiver in accordance with the invention that may be utilized in place of the conventional receiver shown in FIG. 12 in the communication system of FIG. 11.

In the presence of imperfections, in accordance with the invention, the RAKE receiver 64 is modified as shown in FIG. 13 at 64'. In particular. To decode a subcarrier $f_n$, in addition to projecting over $f_n$, the received signal is projected over the $K_1+K_u$ adjacent subcarriers to $f_n$, i.e., r(t) is projected over $$f_{n,k} = f_n + \frac{k}{T}, \quad k = -K_l, \ldots K_u.$$

Figure 14:
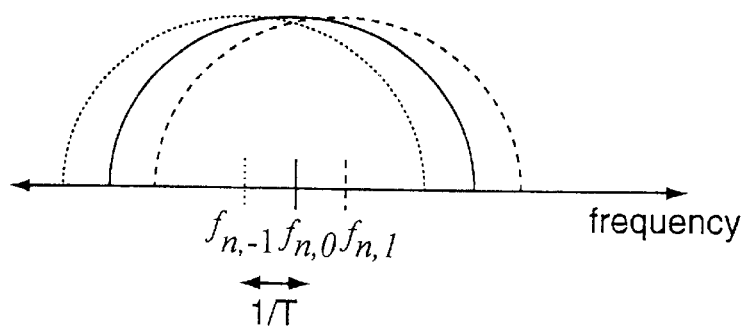
FIG. 14 is a graph illustrating the spectrum of the MC-CDMA signal in the third generation CDMA2000 standards in accordance with the invention.

Let $c_{n,k}$ be the channel coefficient corresponding to $f_{k,n}$. The test statistics are then combined with the set of coefficients $\{c_{n,k}\}$, in parallel to the analysis discussed above. Though the adjacent subcarriers are overlapping they are orthogonal due to integrating over full symbol duration T. FIG. 14 shows the spectrum of the received signal corresponding to $f_n$ in the presence of imperfections.

Figure 15:
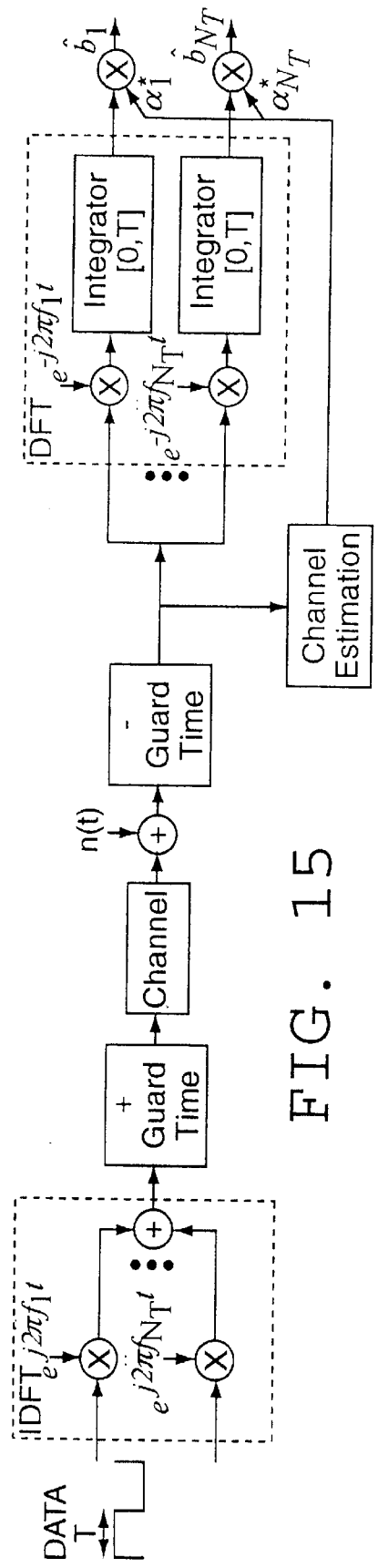
FIG. 15 is a block diagram of a typical MC-TDMA communication system.

The present invention may also be implemented in a multi-carrier time division multiple access (MC-TDMA) system. FIG. 15 shows the conventional MC-TDMA system, which is close to the system in FIG. 4 except for not spreading the signal with a code, i.e., N=1. The transmitted signal can be written as $$s(t) = \sum_{n=1}^{N_T} b_n e^{j2\pi f_n t} q(t) \quad (49)$$

where the different frequencies are separated by multiples of $$\frac{1}{T}$$

and $N_T$ is the number of subcarriers used in transmission. The corresponding received signal can be expressed as $$r(t) = \sum_{n=1}^{N_T} \alpha_n b_n e^{j2\pi f_n t} q(t) + n(t) \quad (50)$$

where $\alpha_n$ is the channel coefficient corresponding to the $n^{th}$ subcarrier. At the receiver, the received signal is projected over the different subcarriers, then each test statistic is combined with the corresponding channel coefficient to generate the decision statistic for each bit.

Figure 16:
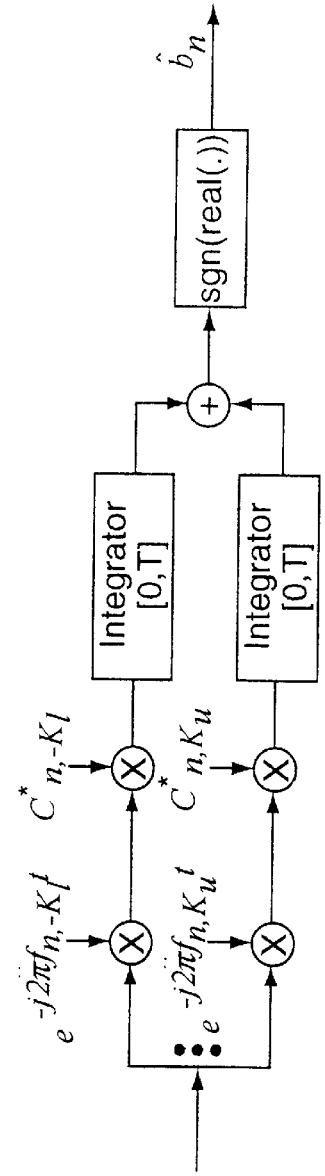
FIG. 16 is a block diagram illustrating a modified receiver in accordance with the present invention that may be utilized in the communication system of FIG. 15.

In the presence of imperfections, the present invention can be implemented in such systems in a manner similar to that described above. In particular, to decode $b_n$, in addition to projecting over $f_n$, the received signal is projected over a set of $K_1+K_u$ adjacent subcarriers to $f_n$. The suitable channel coefficients are then used to combine the different test statistics, as shown in FIG. 16.

Most OFDM techniques treat interference from other users (as well as self interference in the presence of imperfections) as noise. The receiver described herein is applicable in this case for multi-user scenarios. More sophisticated interference suppression techniques, which exploit the structure of the interference received on different subcarriers, can also be used, if desired. See, e.g., "Wireless Communications; Signal Processing Prospective," by V. Poor and Wornell, Prentice Hall 1998.

Figure 17:
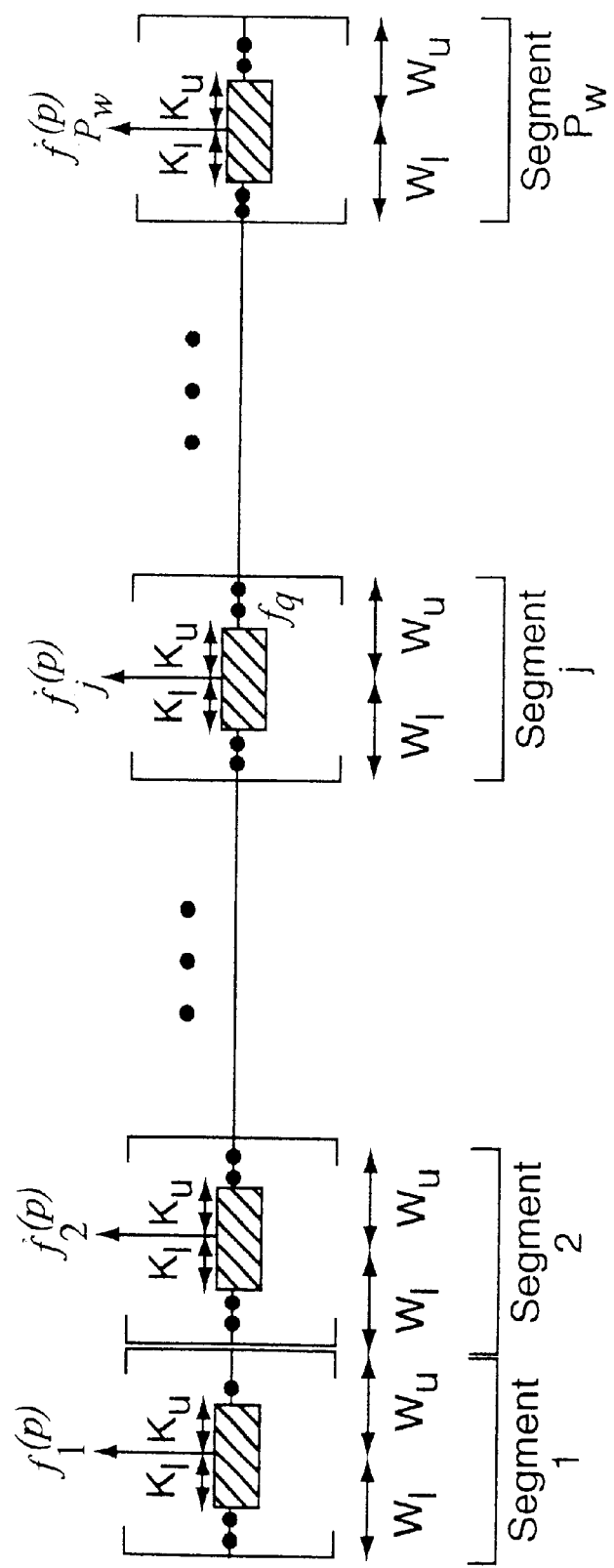
FIG. 17 is a diagram illustrating the division of the bandwidth into segments for transmission of pilot signals.

Various channel estimation techniques may be used in carrying out the present invention. A suitable channel estimation technique relies on the correlation between adjacent subcarriers in the frequency domain. The bandwidth is divided into a number of segments, where the subcarriers belonging to the same segment are highly correlated. A pilot subcarrier is transmitted in each segment. Denote the pilot subcarrier in the $j^{th}$ segment by $f_j^{(p)}$. The bits transmitted on the pilot are known to the receiver. The pilot is used only for channel estimation. A window of w subcarriers around each pilot is used for transmitting useful data. In particular, $w_1$ subcarriers at the left and $w_u$ subcarriers at the right of each pilot are used for transmitting useful data, i.e. $w=w_1+w_u$. Stated differently, the whole bandwidth is divided into $$P_w = \frac{P}{w+1}$$

segments each containing w+1 subcarriers, of which w subcarriers are used for transmitting useful data and the remaining one is a pilot subcarrier. FIG. 17 shows this partition scheme in the frequency domain. In the following, we only focus on the analysis of the pilot signal. The analysis of the data part has been already covered above. When analyzing the pilot signal, we ignore the interference due to the data signal. This assumption is made possible by transmitting with higher signal-to-noise ratio (SNR) on the pilot signal compared to the data signal.

We first estimate the $K_u+K_1+1$ coefficients corresponding to each pilot subcarrier. If $w_u \geq K_u$ and $w_1 \geq K_1$, the different pilot subcarriers are decoupled. In other words, the coefficients corresponding to each pilot subcarrier do not interfere with those corresponding to a different pilot subcarriers. In this technique, we assume that the different pilot subcarriers are well decoupled as shown in FIG. 17. Hence, it suffices to only analyze one of the pilot subcarriers. The transmitted signal corresponding to the $j^{th}$ subcarrier can be written as $$s_j^{(p)}(t) = x_j^{(p)} q(t) e^{j2\pi f_j^{(p)} t} \quad (51)$$

where, $x_j^{(p)}$ is a known signal to the receiver. $x_j^{(p)}$ can be the same for all pilot subcarriers or in general a sequence that is spread among the different pilot subcarriers. Define $c_{j,k}^{(p)}$ to be the $k^{th}$, $K_1 \leq k \leq K_u$, coefficient corresponding to the $j^{th}$ pilot subcarrier. The received signal in the presence of imperfections corresponding to the $j^{th}$ pilot subcarrier can be written as $$r_j^{(p)}(t) = x_j^{(p)} \sum_{k=-K_l}^{K_u} c_{j,k}^{(p)} q(t) e^{j2\pi f_j^{(p)} t} e^{j2\pi \frac{k}{T} t} + n_j^{(p)}(t) \quad (52)$$

$$= x_j^{(p)} \sum_{k=-K_l}^{K_u} c_{j,k}^{(p)} q(t) e^{j2\pi f_{j,k}^{(p)} t} + n_j^{(p)}(t)$$

where $n_j^{(p)}(t)$ is AWGN with variance a $\sigma^2$ and $$f_{j,k}^{(p)} = f_j^{(p)} + \frac{k}{T}.$$

Note that the interference from the data signal is ignored. To estimate $c_{j,k}^{(p)}$, we project $r_j^{(p)}(t)$ over $f_{j,k}^{(p)}$; the resultant test statistic can be written as $$z_{k,j}^{(p)} = x_j^{(p)} c_{j,k}^{(p)} + v_{j,k}^{(p)} \quad (53)$$

where $v_{j,k}^{(p)}$ is the noise sample with the same variance $\sigma^2$. An estimate for $c_{j,k}^{(p)}$ is taken to be $$\hat{c}_{j,k}^{(p)} = \frac{z_{j,k}^{(p)}}{x_j^{(p)}} = c_{j,k}^{(p)} + \frac{v_{j,k}^{(p)}}{x_j^{(p)}} \quad (54)$$

In other words, $\hat{c}_{j,k}^{(p)}$ is a noisy estimate of $c_{j,k}^{(p)}$. Hence, we get good coefficients estimate when high enough SNR is used for the pilot signal.

Figure 18A:
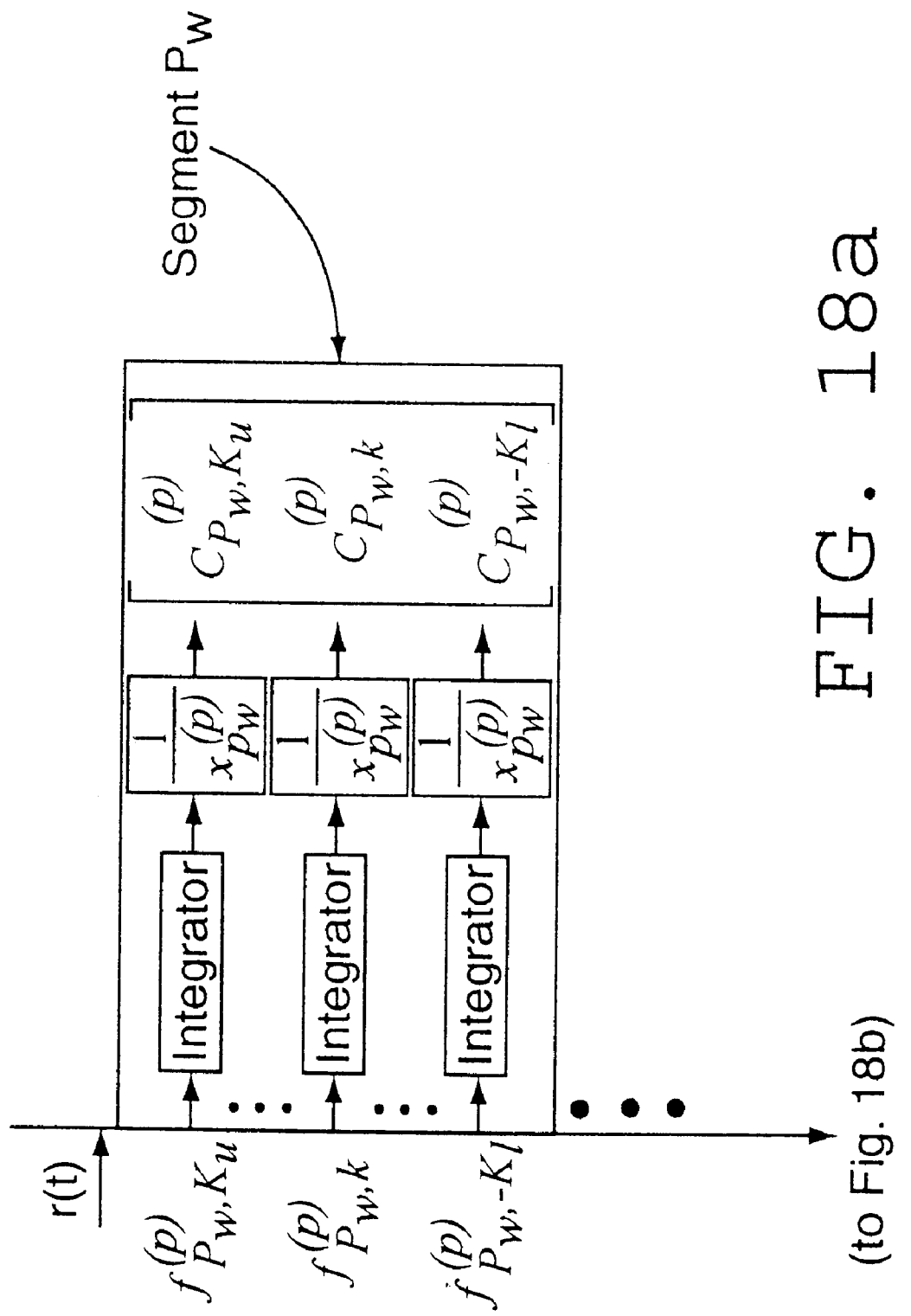
FIG. 18 is a block diagram of a filter system for estimating channel coefficients.
Figure 18B:
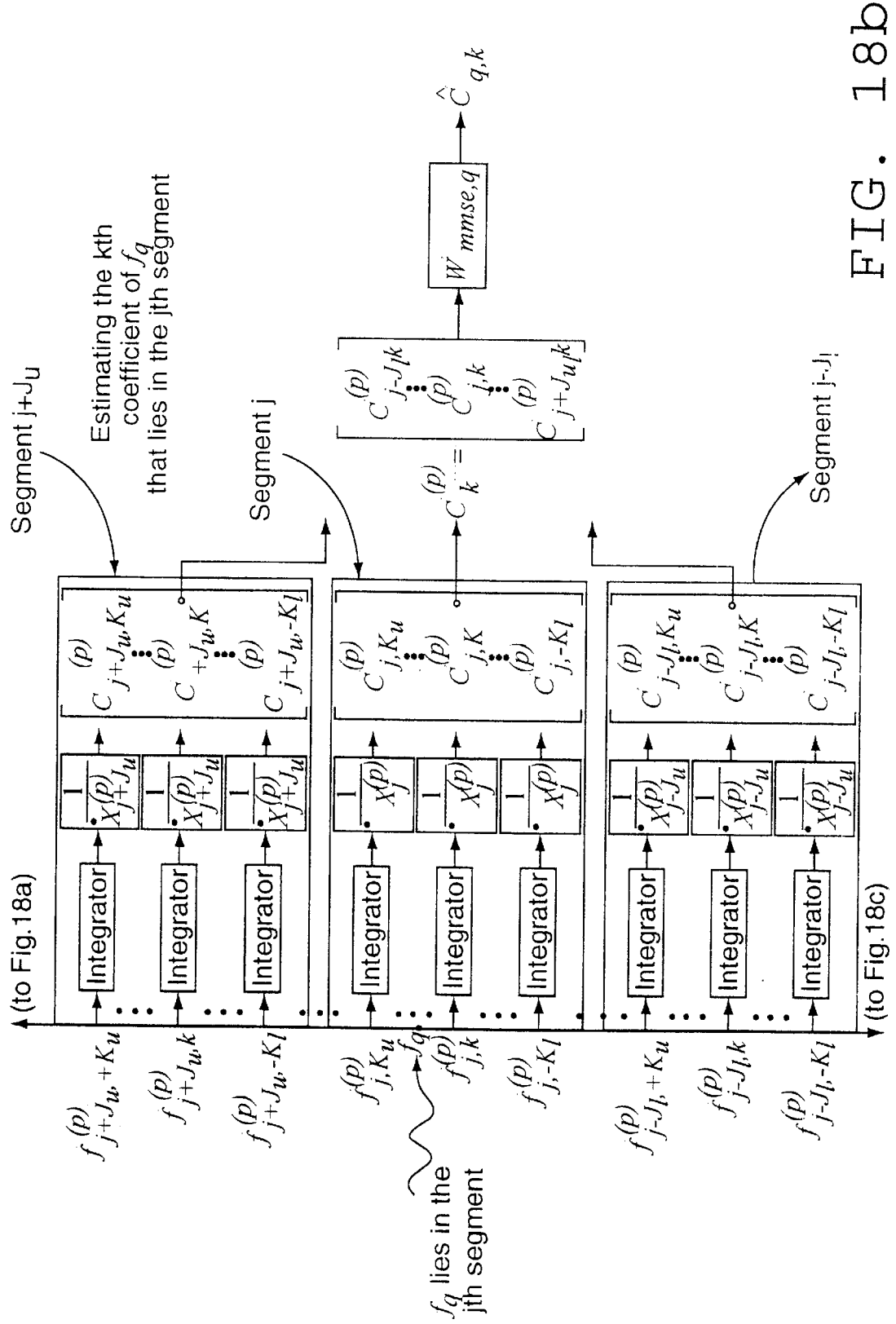
Figure 18C:
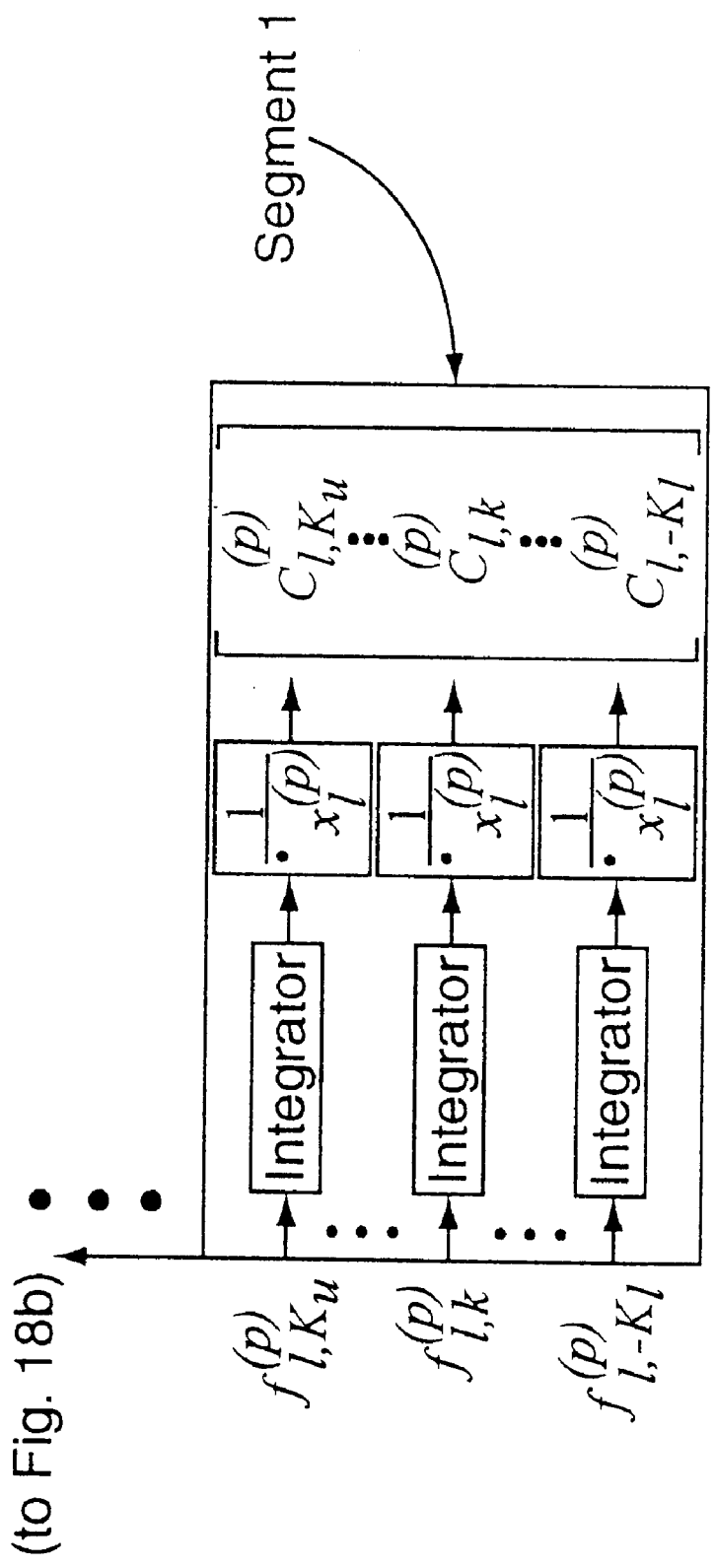

We now discuss estimating the $K_u+K_1+1$ coefficients corresponding to any data subcarrier given the estimates of the $K_u+K_1+1$ coefficients corresponding to some pilot subcarriers. With reference to FIG. 17, let subcarrier q be in the $j^{th}$ segment. Define $c_{q,k}$ to be the $k^{th}$, $K_1 \leq k \leq K_u$, coefficient corresponding to subcarrier q. A linear Minimun Mean Square Error (MMSE) filter is used to estimate $c_{q,k}$ from the set of $k^{th}$ coefficients corresponding to the set of pilot subcarriers $\{f_{j-J_1}^{(p)}, \ldots, f_j^{(p)}, \ldots f_{j+J_u}^{(p)}\}$. That is, $\{c_{j-J_1,k}^{(p)}, \ldots, c_{j,k}^{(p)}, \ldots c_{j+J_u,k}^{(p)}\}$ are used to estimate $c_{q,k}$ uing a linear MMSE filter $w_{mmse,q}$. This is illustrated in FIG. 18. The value of $J=J_u+J_u$ is the number of pilot subcarriers correlated to subcarrier q. For most practical purposes $J_1=J_u=1$ is enough to capture the correlation with subcarrier q.

For convenience of notation, let $$c_k^{(p)} = \begin{bmatrix} c_{j-J_1,k}^{(p)} \\ \vdots \\ c_{j,k}^{(p)} \\ \vdots \\ c_{j+J_u,k}^{(p)} \end{bmatrix},$$

the estimate of $c_{q,k}$ can then be written as $$\hat{c}_{q,k} = w_{mmse,q}^H c_k^{(p)} \qquad (55)$$

where $$w_{mmse,q} = R_{c_k^{(p)},c_k^{(p)}}^{-1} E[c_k^{(p)} c_{q,k}^*]. \qquad (56)$$

and $$R_{c_k^{(p)},c_k^{(p)}} = E(c_k^{(p)}, c_k^{(p)H}) \qquad (57)$$

Note that $w_{mmse,q}$ depends on the correlation between the different coefficients. Hence, $w_{mmse,q}$ can be obtained using the correlation function defined in Eqn. (17) above.

We now discuss the upper bound of w. We note that there exists roughly $$\frac{B}{\Delta f_c} \approx L$$

uncorrelated segments in the whole bandwidth, where $\Delta f_c$ is the coherence bandwidth of the channel defined to be the frequency span over which the different channel coefficients are strongly correlated. The number of subcarriers in each segment is $$P_L = \frac{P}{L}.$$

To have the data subcarrier in each segment correlated with the pilot subcarrier in the same segment, it is required to have $w_1+w_u+1 \leq P_L \Rightarrow w \leq P_L-1$. Following the same argument, the minimum number of pilot subcarriers is L.

A similar idea can be employed by sending periodic training sequences. In this case, the training sequences are transmitted at different time slots from the data.

It is understood that the invention is not limited to the embodiments set forth herein as illustrative, but embraces all such forms thereof as come within the scope of the following claims.

What is claimed is:

1. A receiver for receiving and decoding a signal received from a communication channel, wherein the signal transmitted on the communication channel includes modulated signals on multiple subcarriers at different selected frequencies that encodes data having a selected bit length, comprising:

(a) means for projecting the received signal onto each subcarrier and onto one or more selected adjacent subcarriers for each subcarrier, and means for combining and decoding the signals resulting from the projection to provide a decision statistic signal for each bit length; and (b) means for evaluating the decision statistic signal to determine an estimated bit value over each bit length.

2. The receiver of claim 1 further including means for estimating the communications channel for each subcarrier and adjusting the projection for each subcarrier to match the estimated communications channel for that subcarrier.

3. The receiver of claim 1 wherein the means for evaluating each subcarrier determines the estimated bit value over each bit length as the sign of the real part of the decision statistic signal.

4. The receiver of claim 1 wherein the transmittal signal is a modified multi-carrier code division multiple access signal encoding a selected number M of bits in parallel over the bit length, and wherein the receiver includes a detector path for each bit in the transmitted signal.

5. The receiver of claim 4 further including a parallel to serial converter receiving the estimated bit values from the means for evaluating the decision statistic signal for each detector path to convert the bit values from parallel data to serial data in an output signal.

6. The receiver of claim 1 wherein each decoder applies a decoding sequence to the combined signal that decodes selected encoded information in the transmitted signal on the communications channel.

7. The receiver of claim 1 wherein the adjacent subcarriers onto which the received signal is projected are all active subcarriers in the transmitted signal.

8. The receiver of claim 7 wherein the spacing between active subcarriers in the transmitted signal is 2/T, where T is the bit duration of a data signal which is encoded and modulated on the transmitted signal.

9. The receiver of claim 7 wherein the spacing between active subcarriers in the transmitted signal is 1/T, where T is the bit duration of a data signal which is encoded and modulated on the transmitted signal.

10. The receiver of claim 1 wherein the adjacent subcarriers onto which the received signal is projected are both active and inactive subcarriers in the transmitted signal.

11. The receiver of claim 1 wherein the adjacent subcarriers onto which the received signal is projected for each subcarrier include at least two subcarriers above or below the frequency of the subcarrier.

12. The receiver of claim 1 wherein the received signal is a function of time, r(t), and wherein, in the means for projecting, the received signal r(t) is projected over a selected set of subcarriers at frequencies $f_{i,n,k}$ to provide a test statistic $z_{i,n,k}$ in accordance with $$z_{i,n,k} = \frac{1}{\sqrt{T}} \int_0^T r(t) e^{-2\pi f_{i,n,k} t} dt,$$

where T is the bit length of a bit in the transmitted signal, and wherein the decoder determines $$\zeta_{i,n} = \sum_{k=-K_l}^{K_u} a_n^* c_{i,n,k}^* z_{i,n,k},$$

where $c_{i,n,k}$ are channel estimators for the communications channels corresponding to the subcarrier frequencies $f_{i,n,k}$ and $\{a_n\}$ is the code sequence for a particular user, the decision statistic signal $\zeta_i$ for each bit $b_i$ in the transmittal signal is $$\zeta_i = \sum_{n=1}^{N} \zeta_{i,n}$$

where N is the total number of subcarriers, and the bit decision $\hat{b}_i$ for the bit $b_i$ is determined in accordance with $\hat{b}_i = \text{sign}(\text{real}(\zeta_i))$, $i \geq 1$.

13. The receiver of claim 12 including means for estimating the channel coefficients $c_{i,n,k}$ utilizing pilot subcarriers.

14. The receiver of claim 1 wherein the signal transmitted on the communications channel is a multicarrier code division multiple access signal.

15. The receiver of claim 1 wherein the signal transmitted on the communications channel is a multicarrier time division multiple access signal.

16. A method of receiving and decoding a signal received from a communication channel on which a signal is transmitted that includes modulated signals on multiple subcarriers at different selected frequencies that encode data having a selected bit length comprising:
   (a) receiving the signal from the communications channel;
   (b) for each selected subcarrier frequency in the received signal, projecting the received signal onto such subcarrier and onto one or more selected adjacent subcarriers;
   (c) combining and decoding the signals resulting from the projections to provide a decision statistic signal for each bit length; and
   (d) evaluating the decision statistic signal to determine an estimated bit value over each bit length.

17. The method of claim 16 further including estimating the communications channel for each subcarrier and adjusting the projection for each subcarrier to match the estimated communications channel for that subcarrier.

18. The method of claim 16 wherein in evaluating each subcarrier the estimated bit value is determined over each bit length as the sign of the real part of the decision statistic signal.

19. The method of claim 16 wherein the transmitted signal is a modified multi-carrier code division multiple access signal encoding a selected number M of bits in parallel over the bit length, and wherein steps (a) through (d) are carried out in parallel for each of the M bits encoded in the transmitted signal.

20. The method of claim 19 further including converting the M bits decoded in parallel to serial data at the receiver in an output signal.

21. The method of claim 16 wherein decoding the signals resulting from the projections includes applying a user specific decoding sequence to the combined signal that decodes selected encoded information for a particular user in the transmitted signal on the communications channel.

22. The method of claim 16 wherein the adjacent subcarriers onto which the received signal is projected are all active subcarriers in the transmitted signal which are spaced by 2/T, where T is the bit duration of a data signal which is encoded and modulated on the transmitted signal.

23. The method of claim 16 wherein the adjacent subcarriers onto which the received signal is projected are all active subcarriers in the transmitted signal which are spaced by 1/T, where T is the bit duration of a data signal which is encoded and modulated on the transmitted signal.

24. The method of claim 16 wherein the adjacent subcarriers onto which the received signal is projected are both active and inactive subcarriers in the transmitted signal and wherein such subcarriers are spaced by 1/T, where T is the bit duration of a data signal which is encoded and modulated on the transmitted signal.

25. The method of claim 16 further including the step of selecting the number of adjacent subcarriers onto which the received signal is projected based on the type of imperfection in the transmission of the signal on the communications channel.

26. The method of claim 16 wherein the adjacent subcarriers onto which the received signal is projected include at least two subcarriers above or below the frequency of the subcarrier frequency being decoded.

27. The method of claim 16 wherein the received signal is a function of time, r(t), and wherein in the step of projecting the received signal onto the subcarriers, the received signal r(t) is projected over a selected set of subcarriers at frequencies $f_{i,n,k}$ to provide a test statistic $z_{i,n,k}$ in accordance with $$z_{i,n,k} = \frac{1}{\sqrt{T}} \int_0^T r(t) e^{-2\pi f_{i,n,k} t} \, dt,$$

where T is the bit length of a bit in the transmitted signal, and wherein the decoder determines $$\zeta_{i,n} = \sum_{n=-K}^{N} a_n^* c_{i,n,k}^* z_{i,n,k},$$

where $c_{i,n,k}$ are channel estimators for the communications channels corresponding to the subcarrier frequencies $f_{i,n,k}$, and $\{an\}$ is the code sequence for a particular user, the decision statistic signal $\zeta_i$ for each bit $b_i$ in the transmittal signal is $$\zeta_i = \sum_{n=1}^{N} \zeta_{i,n}$$

where N is the total number of subcarriers, and the bit decision $\hat{b}_i$ for the bit $b_i$ is determined in accordance with $\hat{b}_i = \text{sign}(\text{real}(\zeta_i))$, $i \geq 1$.

28. The method of claim 27 further including estimating the channel coefficients $c_{i,n,k}$ utilizing pilot subcarriers.

29. The method of claim 16 wherein the transmitted signal is a multicarrier code division multiple access signal.

30. The method of claim 16 wherein the transmitted signal is a multicarrier time division multiple access signal.

* * * * *

UNITED STATES PATENT AND TRADEMARK OFFICE
CERTIFICATE OF CORRECTION

PATENT NO. : 6,654,408 B1
DATED : November 25, 2003
INVENTOR(S) : Tamer Adel Kadous et al.

It is certified that error appears in the above-identified patent and that said Letters Patent is hereby corrected as shown below:

Column 4,
Line 63, delete "$\alpha_p$" and replace with -- $\tilde{a}_p$ --.
Line 65, delete "$b_i$" and replace it with -- $b_1$ --.

Column 5,
Line 28, delete the words "Define also the sets" and replace them with -- Define also the set --.

Column 7,
Line 12, delete "$\Gamma^2$" and replace it with -- $\sigma^2$ --.

Lines 41-42, delete the equation "$u^n(t)=q(t)e^{j2\pi f_{is}^n t}$" and replace it with -- $u_n(t) = q(t) e^{j2\pi f_n^i t}$ --.

Column 10,
Line 29, delete " $\tilde{z} = v_n$ " and replace it with -- $\tilde{z}_n = \tilde{v}_n$ --.

Column 11,
Equation (24), remove the space in "sin c" to read -- sinc --.

Column 11,
Equation (26), remove the space in both occurrences of "sin c" to read -- sinc --.

Column 12,
Line 45, delete Equation (30) entirely and replace it with

-- $\varsigma = \int_0^T x^*(t) e^{-jQ(t)} r(t) dt = b_1 \int_0^T |x(t)|^2 dt + \int_0^T x^*(t) n(t) dt.$ --.

Column 14,
Line 40, delete "$f_{n,k}$" and replace with -- $f_{i,n,k}$ --.

Column 16,
Lines 30 and 49, delete "$\alpha(t)$" and replace it with -- a(t) --.
Line 64, delete "To decode" and replace it with -- to decode --.

Column 18,
Approximately line 28, delete Equation (51) entirely and replace it with
--
$$s_j^{(p)}(t) = x_j^{(p)} q(t) e^{j2\pi f_j^{(p)} t}$$

UNITED STATES PATENT AND TRADEMARK OFFICE
CERTIFICATE OF CORRECTION

PATENT NO. : 6,654,408 B1
DATED : November 25, 2003
INVENTOR(S) : Tamer Adel Kadous et al.

It is certified that error appears in the above-identified patent and that said Letters Patent is hereby corrected as shown below:

Column 18, cont'd.,
Lines 32 and 51, delete "$c_{j,k}^{(p)}$" and replace it with ---- $c_{j,k}^{(p)}$ .

Line 51, delete " $r_j^{p)}(t)$ " and replace it with -- $r_j^{(p)}(t)$ --.

Approximately line 55, delete Equation (53) entirely and replace it with

-- $z_{j,k}^{(p)} = x_j^{(p)} c_{j,k}^{(p)} + v_{j,k}^{(p)}$ --.

Lines 57 and 63, delete "$c_{j,k}^{(p)}$" and replace it with -- $c_{j,k}^{(p)}$ --.

Line 63, delete "$\hat{c}_{j,k}^{(p)}$" and replace it with -- $\hat{c}_{j,k}^{(p)}$ --.

Column 19,
Line 7, delete " $\{f_{j-J_l}^{(p)},...,f_j^{(p)},...f_{j+J_u}^{(p)}\}$ " and replace it with -- $\{f_{j-J_l}^{(p)},...,f_j^{(p)},...f_{j+J_u}^{(p)}\}$ --.

Line 8, delete " $\{c_{j-J_l,k}^{(p)},...,c_{j,k}^{(p)},...c_{j+J_u,k}^{(p)}\}$ " and replace it with
-- $\{c_{j-J_l,k}^{(p)},...,c_{j,k}^{(p)},...c_{j+J_u,k}^{(p)}\}$ --.

Delete Equation (55) entirely and replace it with -- $\hat{c}_{q,k} = \mathbf{w}_{mmse,q}^H \mathbf{c}_k^{(p)}$ --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,654,408 B1
DATED          : November 25, 2003
INVENTOR(S)    : Tamer Adel Kadous et al.

It is certified that error appears in the above-identified patent and that said Letters Patent is hereby corrected as shown below:

Column 19,
Delete Equation (56) entirely and replace it with $$-- \mathbf{w}_{mmse,q} = \mathbf{R}^{-1}_{\mathbf{c}_k^{(p)}, \mathbf{c}_k^{(p)}} E\left[\mathbf{c}_k^{(p)} c^*_{q,k}\right] --.$$

Signed and Sealed this

Fifth Day of October, 2004

JON W. DUDAS
*Director of the United States Patent and Trademark Office*